United States Patent [19]
Ooi et al.

[11] Patent Number: 5,659,409
[45] Date of Patent: Aug. 19, 1997

[54] LIGHT SOURCE APPARATUS USING A CONE-LIKE MATERIAL AND AN APPLIED APPARATUS THEREOF

[75] Inventors: Yoshiharu Ooi; Tsuneo Wakabayashi; Shigeyuki Serizawa; Yoshiyuki Sonda, all of Yokohama, Japan

[73] Assignee: AG Technology Co., Ltd., Yokohama, Japan

[21] Appl. No.: 133,222

[22] Filed: Oct. 7, 1993

[30] Foreign Application Priority Data

| Oct. 9, 1992 | [JP] | Japan | 4-298019 |
| Oct. 9, 1992 | [JP] | Japan | 4-298020 |
| Feb. 18, 1993 | [JP] | Japan | 5-52920 |
| Apr. 14, 1993 | [JP] | Japan | 5-111043 |

[51] Int. Cl.$^6$ ............ G02F 1/1335; H04N 9/31
[52] U.S. Cl. ............ 349/10; 353/37; 349/67
[58] Field of Search ............ 359/40, 51, 41, 359/99, 48, 69, 49, 618; 353/31, 34, 122, 37, 98, 99; 355/67, 71; 362/268, 339

[56] References Cited

U.S. PATENT DOCUMENTS

| 4,613,207 | 9/1986 | Fergason | 359/41 |
| 4,818,070 | 4/1989 | Gunjima et al. | 359/93 |
| 4,834,509 | 5/1989 | Gunjima et al. | 359/52 |
| 5,035,486 | 7/1991 | Inokuchi | 359/625 |
| 5,103,327 | 4/1992 | Hirai et al. | 359/51 |
| 5,150,232 | 9/1992 | Gunkima et al. | 359/51 |
| 5,162,934 | 11/1992 | Gunjima et al. | 359/51 |
| 5,170,250 | 12/1992 | Ledebuhr | 353/38 |
| 5,196,952 | 3/1993 | Hirai et al. | 359/51 |
| 5,216,531 | 6/1993 | Hirai et al. | 359/52 |
| 5,235,445 | 8/1993 | Hirai et al. | 359/52 |
| 5,245,449 | 9/1993 | Ooi et al. | 359/40 |
| 5,274,480 | 12/1993 | Hirai et al. | 359/40 |
| 5,299,036 | 3/1994 | Nicolas et al. | 359/41 |
| 5,379,083 | 1/1995 | Tomita | 353/122 |
| 5,398,081 | 3/1995 | Jones | 359/40 |
| 5,451,103 | 9/1995 | Hatanaka et al. | 353/31 |

FOREIGN PATENT DOCUMENTS

| 0 415 396 | 3/1991 | European Pat. Off. |
| 0 509 194 | 10/1992 | European Pat. Off. |
| 61-174898 | 8/1986 | Japan |

(List continued on next page.)

OTHER PUBLICATIONS

Proceedings of the Twelfth International Display Research Conference, Japan Display '92, Hiroshima, Japan, Oct. 12–14, 1992, pp. IV–XIV & 113–116, Y. Ooi, et al., "S5–3 LCPC Projection Display System for HDTV".

(List continued on next page.)

*Primary Examiner*—William L. Sikes
*Assistant Examiner*—Tai V. Duong
*Attorney, Agent, or Firm*—Oblon, Spivak, McClelland, Maier & Neustadt, P.C.

[57] ABSTRACT

A projection type display apparatus comprising a light source apparatus which is provided with an elliptic mirror 12, a light source 11 disposed at the first focal point, a cone-like material disposed at the second focal point, a condenser lens 13, display elements 15R–15B, a color separating and synthesizing optical system, second condenser lenses 16R–16B and a projection lens 19. The cone-like material is one selected from the group of a convex cone lens, a concave cone lens 2, a convex cone-like reflector and a concave cone-like reflector 20. In the projection type display element, light emitted from the light source is introduced into the cone-like material and is emitted as divergent light through the conical surface of the cone-like material. The divergent light is introduced into the condenser lens 13 so that the light is rendered to be parallel light fluxes, which are color-separated and introduced into the display elements 15R–15B disposed for each color in order to form light fluxes of display colors. The light fluxes are again subjected to color synthesization, and the synthesized light is projected as a full color picture image on a screen through the projection lens 19. The projection type display apparatus provides a display having uniformity, a good contrast ratio and brightness.

29 Claims, 12 Drawing Sheets

FOREIGN PATENT DOCUMENTS

| | | |
|---|---|---|
| 62-25933 | 2/1987 | Japan . |
| 63-293547 | 11/1988 | Japan . |
| 4-13104 | 1/1992 | Japan . |
| 4-113344 | 4/1992 | Japan . |
| 4-127102 | 4/1992 | Japan . |
| 4-138410 | 5/1992 | Japan . |
| 4-142528 | 5/1992 | Japan . |
| 4-215622 | 8/1992 | Japan . |
| 4-232917 | 8/1992 | Japan . |
| 4-305637 | 10/1992 | Japan . |
| 5-249408 | 9/1993 | Japan . |
| 6-118380 | 4/1994 | Japan . |
| 6-342158 | 12/1994 | Japan . |
| WO 92/16871 | 10/1992 | WIPO . |

OTHER PUBLICATIONS

Proceedings of the Twelfth International Display Research Conference, Japan Display '92, Oct. 1992, "S5–3 LCPC Projection Display System for HDTV", Y. Ooi, et al.

Nikkei Electronics, vol. 494, 1990, pp. 122–136.

Applied Optics, Jul. 10, 1992, vol. 31, No. 20, Cardinal Warde, et al., "Charge–Transfer–Platee Spatial Light Modulators", pp. 3971–3979.

1989 Autumn Meeting of Electronics, Information and Communication Academy, "Reflective Type High Density TFT Array for High Definition Liquid Crystal Projection TV", pp. 5–30.

Liquid Crystals Applications and Uses, vol. 1, 1990, S.E. Shields, et al., "Light Valve Projection Mode LCDs", pp. 455–467, 488–489.

SPIE vol. 1255 Large–Screen Projection Displays II (1990), R. Gerhard–Multhaupt, et al., "Viscoelastic Spatial Light Modulators and Schlieren–Optical Systems for HDTV Projection Displays", pp. 69–78, 1990.

Patent Abstracts of Japan, vol. 16, No. 421 (P–1414), Sep. 4, 1992, JP–A–04 142 528., May 15, 1992.

LIGHT SOURCE APPARATUS USING A CONE-LIKE MATERIAL AND AN APPLIED APPARATUS THEREOF

BACKGROUND OF THE INVENTION

1. Field of the Invention

The present invention relates to a light source apparatus using a cone-shaped (also referred to as cone-like) material or element and an applied apparatus thereof such as illuminating apparatus or a display apparatus, in particular, a projection type display in combination of a display element having a transparent-scattering type operation mode and the above-mentioned light source apparatus.

2. Discussion of Background

FIGS. 23 through 26 show conventional techniques, and Tables 6 through 11 show comparison of the performance between the light source apparatus and the projection type display according to the present invention and the conventional technique.

First, the invention disclosed in Japanese Unexamined Patent Publication No. 113344/1992 is explained with reference to FIG. 26. In FIG. 26, a light source apparatus 100A comprises an elliptic mirror 12, a light source 11 disposed in the vicinity of the first focal point of the elliptic mirror 12 and a first aperture 17 disposed in the vicinity of the second focal point. Further, a projection type optical apparatus 150A comprises the light source apparatus described above and a transparent-scattering type display element and a projection optical system. This invention is to obtain parallel light fluxes having high collimation and luminous flux.

FIG. 24 shows the invention disclosed in Japanese Unexamined Patent publication No. 142528/1992 in which a light source apparatus 100B comprises a light source 11, an elliptic mirror 12, a prism 5 of a long rod-like shape and a first aperture 17 and an optical converging means 13. Further, a projection type display 150B comprises the above-mentioned light source apparatus, a transparent-scattering type display element 15, a second aperture 18 and a projection lens 19.

FIG. 23 is an enlarged cross-sectional view of the prism 5. The prism 5 is provided with convex conical surfaces 5a, 5b at the side into which light enters and a curved convex surface 5e at the side from which the light is emitted. The prism 5 has a long cone-shape wherein the thickness is gradually reduced from the light incident side to the light emission side so that the light is totally reflected many times at the slanted surface 5f in view of the inside of the prism 5.

The invention disclosed in International Publication Number WO92/16871 will be described with reference to FIG. 25. In FIG. 25, a light source apparatus 100C comprises a light source 11, a parabolic mirror 14 and two optical elements 6a, 6b each having a circular cone shape in cross section. Further, a projection type optical apparatus 150C comprises the above-mentioned light source apparatus, a transparent-scattering type display element and a projection optical system which is temporarily indicated in comparison with the structures of the present invention. The optical elements 6a, 6b are so disposed as to face the bottom surfaces whereby light fluxes pass parallel light paths. In this invention, substantially parallel light fluxes are obtainable without causing a shadow.

In the next, FIG. 1 of Japanese Unexamined Patent Publication No. 138410/1992 is referred to explain a conventional technique. In FIG. 1, there is shown a projection apparatus constituted by a light source emitting parallel light fluxes which comprises a light source, a first condenser lens and two cone lenses, a second condenser lens and a projection lens and so on. The subject of the disclosed invention is to obtain a projected image having a substantially uniform distribution of illuminance on a screen. The light source emitting parallel light fluxes is indicated by numeral 100D and the projection apparatus is indicated by numeral 150D which are temporarily indicated in comparison with the structures of the present invention.

FIGS. 1 and 2 of Japanese Unexamined Patent Publication No. 293547/1988 show an optical illuminating apparatus comprising two elliptic mirrors and a cone prism which functions as a light beam direction changing member. The subject matter of the invention is to obtain a light flux having a high luminous flux.

Further, in Nikkei Electronics, Vol. 494, p. 122, there is shown a full color projection type liquid crystal display apparatus comprising a color separating and synthesizing optical system having a light source and a dichroic mirror arranged to have an angle of incidence of 45° to the light source and liquid crystal elements for R, G and B colors. The conventional apparatus which is temporarily indicated in comparison with the structures of the present invention is referred to as numeral 300.

In the above-mentioned conventional apparatuses, the light sources apparatuses 100A through 100D have such means that light emitted from the light source is adjusted in size and is introduced to the display element and so on whereby a light flux having an appropriate brightness is obtainable. Namely, efficiency of light utilization can be increased, and uniform light can be obtained by, for instance, moving in parallel a light path for a light flux from an actual lamp as a non-point light source.

In these conventional apparatuses, however, it was insufficient to obtain a uniform distribution of light energy irradiated to the display element from the light source system and good efficiency of light utilization while maintaining high collimation, because it was difficult to compensate sufficiently the reduction of efficiency of light utilization which was due to a distribution of light from a light emitting part having a finite length and non-uniformity of light fluxes, as well as difficulty in obtaining the light fluxes having a high collimation. For instance, the optical divergence total angle of the parallel light flux obtained by using a parabolic mirror was about 12°–15°.

It is an object of the present invention to provide a light source apparatus having a high collimation of light, a uniform illuminance at an irradiation surface and a high luminous flux.

Further, it is an object of the present invention to provide a projection type display which is in combination of a transparent-scattering type display element having a high transparent characteristic and a high scattering characteristic and the light source described above, and which can achieve a high efficiency of light utilization and a high contrast ratio as well as a high uniformity of a projected picture image which could not be obtained by the conventional projection type display apparatuses.

Further, the present invention is to provide the projection type display apparatus having a small and rigid structure and is capable of adjusting the light flux and the contrast ratio for a projected picture image.

In accordance with the present invention, there is provided a first light source apparatus which comprises an elliptic mirror 12; a light source 11 disposed in the vicinity of the first focal point of the elliptic mirror 12; a cone-like material disposed in the vicinity of the second focal point of the elliptic mirror 12 so that the apex of the cone-like material is substantially on the optical axis of the same, and an optical converging means 13, whereby light emitted from the light source 11 is reflected and converged by the elliptic mirror 12 to be incidented into the cone-like material; the light is emitted through the conical surface of the cone-like material, and enters as divergent light into the optical converging means 13 by which the light is regulated to be substantially parallel light beams.

There is provided a second light source apparatus wherein in the first light source apparatus, the cone-like material is a convex cone prism 1 having an apex angle $\alpha_1$ of 90°–175° in a plane sectioned to include the optical axis of the prism 1, and a flattened incident surface.

There is provided a third light source apparatus of the present invention wherein in the first light source apparatus, the cone-like material is a concave cone prism having an apex angle $\beta_1$ of 185°–270° in a plane sectioned to include the optical axis of the prism 2, and having a flattened incident surface.

There is provided a fourth light source apparatus of the present invention wherein in the first light source apparatus, the cone-like material is a convex cone-like reflector 10 having an apex angle $\alpha_2$ of 150°–177° in a plane sectioned to include the angular bisector between the incident optical axis and the output optical axis of the reflector.

There is provided a fifth light source apparatus of the present invention wherein in the first light source apparatus, the cone-like material is a concave cone-like reflector 20 having an apex angle $\beta_2$ of 183°–210° in a plane sectioned to include the angular bisector between the incident optical axis and the output optical axis of the reflector.

In the present invention, there is provided a sixth light source apparatus wherein in any of the first through fifth light source apparatuses, the cone-like material is an apex angle the shape of which has different in planes sectioned by at least two planes including the axially symmetrical axis of the material.

In the present invention, there is provided a seventh light source apparatus wherein in any of the first through fifth light source apparatuses, the cone-like material has an elliptic or rectangular shape in a cross-sectional view sectioned by a plane in which the axially symmetrical axis of said cone-like material is a normal line.

In the present invention, there is provided an eighth light source apparatus wherein in any of the first through seventh light source apparatuses, a first aperture 17 is disposed in front or rear of the cone-like material.

In the present invention, there is provided a first projection type display apparatus which comprises a light source apparatus comprising an elliptic mirror 12; a light source 11 disposed in the vicinity of the first focal point of the elliptic mirror 12; a cone-like material disposed in the vicinity of the second focal point of the elliptic mirror 12 so that the apex of the cone-like material is substantially on the optical axis of the same; and an optical converging means 13, whereby light emitted from the light source 11 is reflected and converged by the elliptic mirror to incident into the cone-like material; the light is emitted through the conical surface of the cone-like material, and enters as divergent light into the optical converging means 13 by which the light is regulated to be substantially parallel light beams;

a color separating and synthesizing optical system comprising a color separating optical system having an angle of incidence of 15°–40°, preferably 15°–35°, the angle of incidence being formed by the normal line for the optical surface of a color separating means and the optical axis, and a color synthesizing optical system having an angle of incidence of 15°–40°, preferably, 15°–35°, the angle of incidence being formed by the normal line for the optical surface of a color synthesizing means and the optical axis, display elements 15 disposed in the light paths extending between the color separating optical system and the color synthesizing optical system, and a projection optical system.

More specifically, the angle formed by the intersection of the normal line for the optical surface and the optical axis is preferably 30°.

In the present invention, there is provided a second projection type display apparatus wherein in the first projection type display apparatus, dichroic mirrors are used as the color separating means of the color separating optical system and the color synthesizing means of the color synthesizing optical system; the display elements 15 are of a transparent and scattering type and are disposed in the light paths for each of color-separated light, and a second converging means 16 is disposed in front or rear of each of the display elements 15 in the light path.

There is provided a third projection type display apparatus wherein in the first or second projection type display apparatus, the cone-like material is a convex cone prism 1.

There is provided a fourth projection type display apparatus wherein in the first or second projection type display apparatus, the cone-like material is a concave cone prism 2.

There is provided a fifth projection type display apparatus wherein in the first or second projection display apparatus, the cone-like material is a convex cone-like reflector 10.

There is provided a sixth projection type display apparatus wherein in the first or second projection type display apparatus, the cone-like material is a concave cone-like reflector 20.

There is provided a seventh projection type display apparatus wherein in the second projection display apparatus, a second aperture means 18 having an opening portion is disposed substantially at the focal point of the second optical converging means 16.

There is provided an eighth projection type display apparatus wherein in any of the first through seventh projection type display apparatuses, the display element 15 comprises a liquid crystal and solidified matrix composite in which a nematic liquid crystal having a positive dielectric anisotropy is dispersed and held in a solidified matrix between a pair of substrates with an electrode whereby the display element 15 exhibits a transparent and scattering type operation mode wherein the refractive index of the solidified matrix is in coincidence with that of the liquid crystal in either state of the application or non-application of a voltage.

In accordance with the present invention, there is provided a first reflection type optical apparatus which comprises an optical apparatus comprising in combination of a light source emitting a plurality of separated light fluxes, a cone-like material and a light converging means 13, and a display element 15 provided with a liquid crystal and solidified matrix composite which has the function of changing a transparent and scattering state of light by an external signal whereby substantially parallel light fluxes emitted from the light source apparatus are passed several times through the liquid crystal and solidified matrix composite.

In accordance with the present invention, there is provided a second reflection type optical apparatus wherein in the first reflection type optical apparatus, a color filter or a color separating and synthesizing optical system is provided for the display element (15) so that colored light is formed.

The light emission part of the light source 11 is in fact a cylindrical body having a finite length. In this case, there is provided a ninth light source apparatus of the present invention wherein in the first light source apparatus, the first focal length of the elliptic mirror 12 is $F_1$, the second focal length of it is $F_2(F_2>F_1)$, the lengths of the light emission part of the light source 11 in the parallel direction and the vertical direction with respect to the rotation symmetric axis of the elliptic mirror 12 are respectively R and S, and the distances $\Delta R$ and $\Delta S$ of the apex of the cone-like material to the second focal point in the parallel direction and the vertical direction to the rotation symmetric axis of the elliptic mirror 12 are respectively:

$$\Delta R \leq 0.25 \times R \times (F_2/F_1)^2$$

and $$\Delta S \leq 0.5 \times S \times (F_2/F_1).$$

There is provided the tenth light source apparatus of the present invention wherein in the ninth light source apparatus, the length R of the light emission part of the light source 11 is:

$$10 \text{ mm} \geq R \geq 0.2 \text{ mm}$$

and the effective surface area $S_A$ of the light incident side of the cone-like material is represented by:

$$0.2 \times (R \times F_2/F_1)^2 \leq S_A \leq 0.8 \times (F_2 \times F_1).$$

Practically, a light source lamp having a range of 1 mm$\leq$R$\leq$7 mm is generally used.

In accordance with the present invention, there is provided an eleventh light source apparatus wherein in any light source apparatus among the first, the ninth and the tenth light source apparatuses, a relation of $$f_1^2/1000 \leq S_A \leq f_1^2/40$$

is satisfied wherein the focal length of the optical converging means 13 is $f_1$ and the effective cross-sectional area perpendicular to the optical axis of the cone-like material which is a divergent light effective area at the light emission side of the cone-like material or the opening surface area of the aperture 17 is $S_B$.

In more detailed explanation, an orthogonal coordinate system is considered wherein the rotation symmetric axis of the elliptic mirror is an X-axis, and axes perpendicular to the X-axis at an end point at the first focal position side of the elliptic mirror are respectively a Y-axis and a Z-axis, and a cylindrical shape wherein the length in the X-axis of the light emission part of the light source located at the first focal position of the elliptic mirror is R, and the diameter in the Y-axis and the Z-axis is S. In this case, the image of a light emission part of light source located at the first focal point is formed as an enlarged image of that at a position near the second focal point due to the light converging effect of the elliptic mirror. The sizes R' and S' are approximately expressed as:

$$R'=R\chi(F_2/F_1)^2$$

$$S'=S\chi(F_2/F_1)$$

The above-mentioned relation is shown as a model in FIG. 2b and FIG. 2c where Lcen is the center of the light emission Accordingly, when the apex of the cone-like material disposed near the second focal position is within the enlarged image of the cylindrical emission part of light source, uniformity of light flux and light converging effect are obtainable.

Preferably, the apex of the cone-like material is arranged in the directions of R and S, which are defined by the following formulas, from the second focal position of the elliptic mirror:

$$\Delta R \leq 0.25 \times R' = 0.25 \times R \times (F_2/F_1)^2 \quad \text{(A)}$$

$$\Delta S \leq 0.5 \times S' = 0.5 \times S \times (F_2/F_1) \quad \text{(B)}$$

When the elliptic mirror is used as a light converging mirror, the actual light emission part which is not a point light source has its long side which is arranged in the direction of the rotation symmetric axis of the elliptic mirror. For instance, it is approximated as an elongated cylindrical shape having R$\geq$2$\times$S.

Accordingly, the range of $\Delta S$ can be defined by the following formula (C):

$$\Delta S \leq 0.25 \times R' = 0.25 \times R \times (F_2/F_1) \quad \text{(C)}$$

Further, it is preferable that the effective surface area $S_A$ at the light incident side of the cone-like material includes the enlarged image of the light emission part at the second focal position. On the other hand, since the maximum radius of the elliptic mirror in the direction of Y-Z axis is $2\chi(F_2 \times F_1)^{1/2}$, the upper limit in diameter of the effective surface at the light incident side of the cone-like material is preferably about half of the maximum diameter $2\chi(F_2 \times F_1)^{1/2}$. Accordingly, it is preferable to satisfy the following condition:

$$0.2 \times (R \times F_2/F_1)^2 \leq S_A \leq 0.8 \times (F_2 \times F_1) \quad \text{(D)}$$

The collimation index $\Sigma$ of the light flux emitted from the light source apparatus is related as $\tan(\Sigma)=\phi_0/f_1$ wherein $f_1$ is the focal length of a condenser lens as the light converging means 13 and $\phi_0$ is the effective aperture in the light emission surface of the cone-like material.

The effective aperture $\phi_0$ in the light emission surface of the cone-like material may be a diameter of the effective cross-sectional area of the cone-like material itself or an opening diameter of the aperture 17.

When a preferred range of collimated light flux obtained from the light source apparatus of the present invention is $2° \leq \Sigma \leq 10°$ the effective surface area $S_B$ of the light emission surface of the cone-like material satisfies the following formula:

$$f_1^2/1000 \leq SB \leq f_1^2/40 \quad \text{(E)}$$

In accordance with the present invention, there is provided a eleventh light source apparatus of the present invention wherein in above-mentioned light source apparatus, the length of light emission part R, the first focal length $F_1$, the second focal length $F_2$, the diagonal length of display element 15 $D_s$, the focal length of optical converging means 13 $f_1$ and the refractive index of prism $n_p$ satisfy following relationships:

$$1 \text{ mm} \leq R \leq 7 \text{ mm} \quad (a_1)$$

$$1.5R \leq F_1 \quad (a_2)$$

$$3 \leq F_2/F_1 \leq 8 \quad (a_3)$$

$$25 \leq f_1/D_s \leq 70 \quad (a_4)$$

$$40 \leq f_1^2/S_B \leq 1000 \quad (a_5)$$

$$1.45 \leq n_p \leq 1.65 \quad (a_6)$$

and $$100° \leq \alpha_1 \leq 150° \text{ or } 210° \leq \beta_1 \leq 260°.$$

In accordance with the present invention, there is provided a twelfth light source apparatus of the present invention wherein in above-mentioned light source apparatus, the length of light emission part R, the first focal length $F_1$, the second focal length $F_2$, the diagonal length of display element 15 $D_s$, the focal length of optical converging means 13 $f_1$ and the refractive index of prisms $n_p$ satisfy following relationships:

$$1 \text{ mm} \leq R \leq 7 \text{ mm} \quad (a_1)$$

$$1.5R \leq F_1 \quad (a_2)$$

$$3 \leq F_2/F_1 \leq 8 \quad (a_3)$$

$$25 \leq f_1/D_s \leq 70 \quad (a_4)$$

$$40 \leq f_1^2/S_B 1000 \quad (a_5)$$

and $$154° \leq \alpha_2 \leq 169° \text{ or } 191° \leq \beta_2 \leq 206°.$$

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
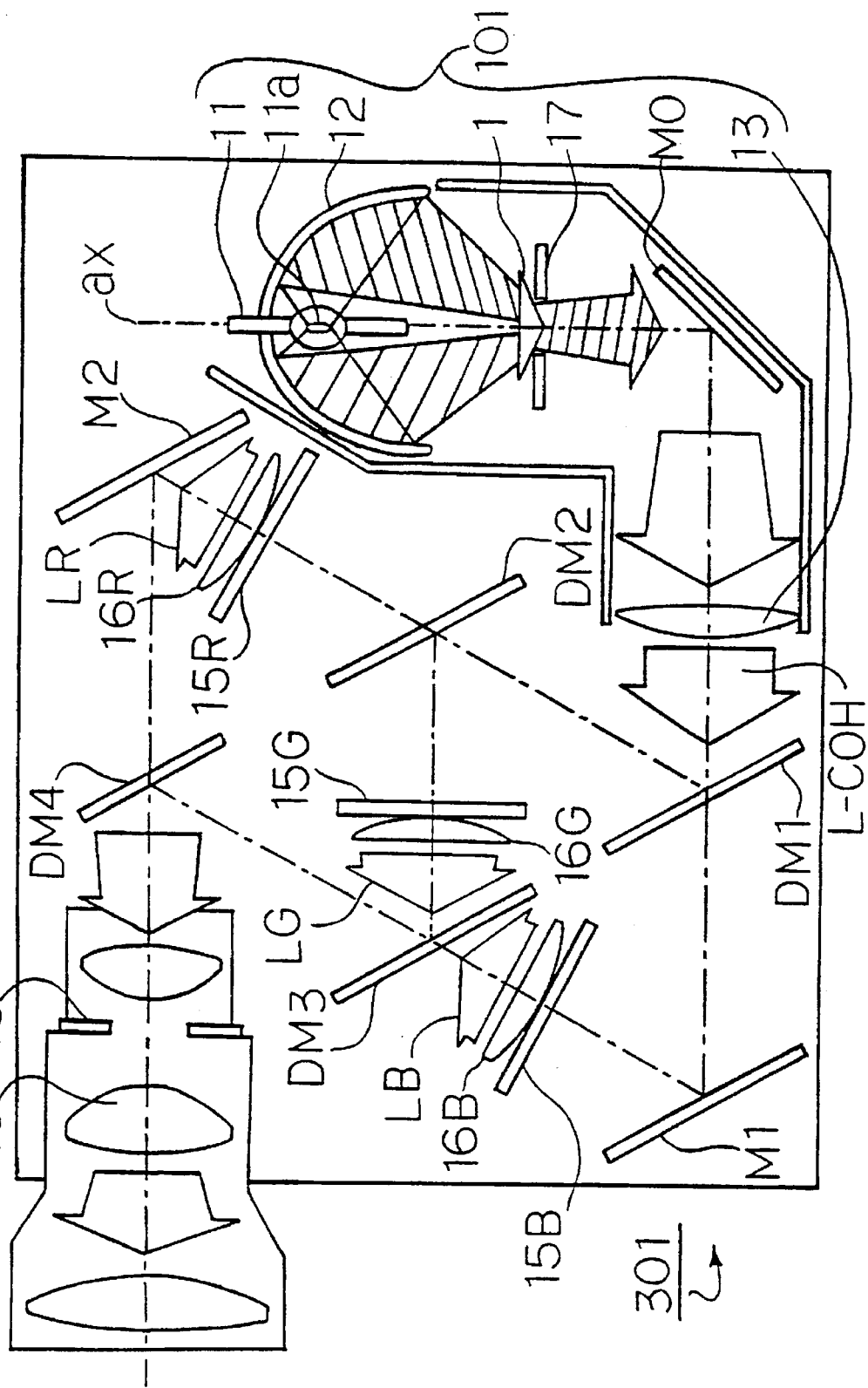
FIG. 1 is a block diagram showing the construction of the projection type display apparatus 301 of the present invention.

Referring to the drawings, preferred embodiments of the present invention will be described wherein the same reference numerals designate the same or corresponding parts.

An embodiment of the projection type display apparatus of the present invention will be described with reference to FIG. 1.

In the same manner as the conventional apparatus 300 and other conventional apparatuses described before, the projection type display apparatus of the present invention comprises a light source apparatus, a color separating and synthesizing optical system for R, G and B colors and a projection type optical system. The first characteristic feature of the light source apparatus of the present invention is to provide substantially collimated light fluxes having a high directivity and a high luminous flux. Then, a projection type display apparatus 301 of high performance can be obtained by effectively utilizing light from the light source and by combining it with an optical system capable of removing needless light.

The light source apparatus indicated by numeral 101 comprises an elliptic mirror 12, a light source 11, a light transparent type convex cone prism 1 and a condenser lens 13 as a light converging means, whereby an intense light flux having a high collimation and a high luminous flux wherein the convergence total angle is 2°–10°, preferably 2°–6° is obtainable.

For the convex cone prism 1, a concave cone prism 2 (FIG. 2), a convex cone-like reflector 10 (FIG. 3) or a concave cone-like reflector 20 (FIG. 4) may be used.

Description will be made as to the structure of each of the structural elements.

The convex cone prism 1 has a convex-like apex angle in cross section of 90°–175°. The concave cone prism 2 has a concave-like apex angle in cross section of 185°–270°. The convex cone-like reflector 10 has a convex-like apex angle in cross section of 150°–177°. The concave cone-like reflector 20 has a concave apex angle of 183°–210°. Namely, the shape of the cone-like material sectioned in a plane including the optical axis of the material is of a convex type or a concave type. In the transparent type prism, a flat surface is formed at a light incident surface side and a conical surface is formed at a light emission surface side, the light being refracted at the surfaces of the prism.

In a case of using the reflector, light is directly led onto the conical surface and reflected therefrom. The detail description of the shape and arrangement will be described hereinafter.

The light source 11 is disposed in the vicinity of the first focal point of the elliptic mirror 12 to reflect the light by the elliptic mirror 12 so that the reflected light is converged to a point near the second focal point. A cone-like material such as a cone prism or a cone-like reflector having a convex type or a concave type in cross section is disposed in the vicinity of the second focal point to receive the light. The divergent light emitted from the conical surface of the convex or concave cone-like prism or reflector is directed to the display element 15 with a light distribution which is different from that of the light distribution incidenting into the cone-like material. Then, the light reaches the condenser lens 13 as a optical converging means by which substantially parallel light fluxes are obtainable.

It is most effective to dispose the cone-like material at the second focal point of the elliptic mirror 12. However, the cone-like material may be disposed at a point shifted in front or rear of the second focal point in the direction of the optical axis. Strictly, the optimum position of the cone-like material is determined by the light distribution from the light source 11. With respect to the second focal point of an ideal elliptic mirror, there is a permissible range of about 2 cm in diameter in the three-dimensional space depending on the size of the light emitting part and the elliptic mirror shape.

In the present invention, parallel light fluxes having a high collimation and uniformity to a specified direction can be produced by increasing the density of the light fluxes from a light emitting part which has a finite length. Since the elliptic mirror covers the substantial portion of emitted light from the light source, a large amount of the light from the light source can be effectively utilized by the reflection of the elliptic mirror, and efficiency can be improved. Further, use of the condenser lens makes the size of the cone-like material and the elliptic mirror small, and it is unnecessary to use a large-sized parabolic mirror which corresponds to an effective display size of the display element. The volume ratio of the cone-like material to the elliptic mirror is about 1/10–1/100.

Further, the first aperture means having an opening portion corresponding to the effective optical surface area of the cone-like material is disposed in front or rear of the cone-like material so that light reaching a portion other than the effective optical surface area of the cone-like material does not reach the light converging means. Practically, a holder for holding the cone-like material functions as the aperture means. It is desirable to use the aperture means having an opening portion corresponding to the display size of the display element, the shape being circular, square, elliptic or rectangular.

With use of the aperture means, a component of light which is emitted from a light emitting part having a finite length and which is not focused to a location in the vicinity of the second focal point, or a component of light which is not reflected at the elliptic mirror and which is propagated directly to the light converging means without passing through the location near the second focal point can be removed, and the collimation of the light fluxes can be arranged or adjusted. Further, needless light which reaches a screen in a scattering state of the display element can be reduced, and the contrast ratio can be remarkably improved. In particular, the above-mentioned advantage can be further improved by providing the second aperture means as means for removing scattering light between the display element and the screen. It is preferable that the shape of the opening portion of the second aperture means is similar to that of the first aperture means.

The collimation angle δ which is the angular deviation of light incident on the display element, is given by the equation:

$$\tan\delta \approx \frac{D_1}{f} \qquad (A_1)$$

where $D_1$ is the mean diameter of the first aperture 17, which is located near the second focal point of the elliptical mirror, and $f_1$ is focal length of the first collimation lens (the optical converging means 13). The collection angle η, which corresponds to the cone angle of light at the output end of display element 15 is given by the equation:

$$\tan\eta \approx \frac{D_2}{f_2} \qquad (B_1)$$

where $D_2$ is the mean diameter of second aperture 18, which is located at the focal point of the field lens 16, and $f_2$ is the focal length of the second condenser lens. In this light source apparatus, it is preferable that the collection angle is almost equal to the collimation angle, therefore $\chi_1/f_1 = \chi_2/f_2$.

Figure 5:
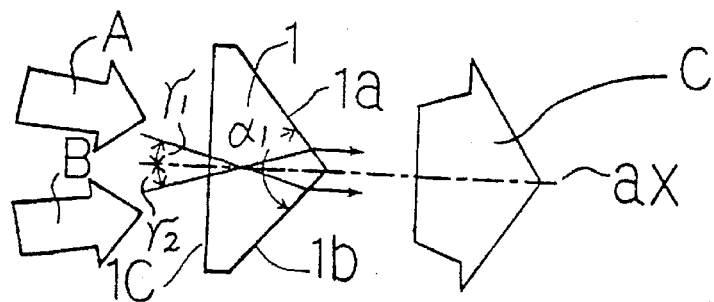
FIG. 5 is a diagram showing a light path in the vicinity of a convex cone prism.
Figure 31:
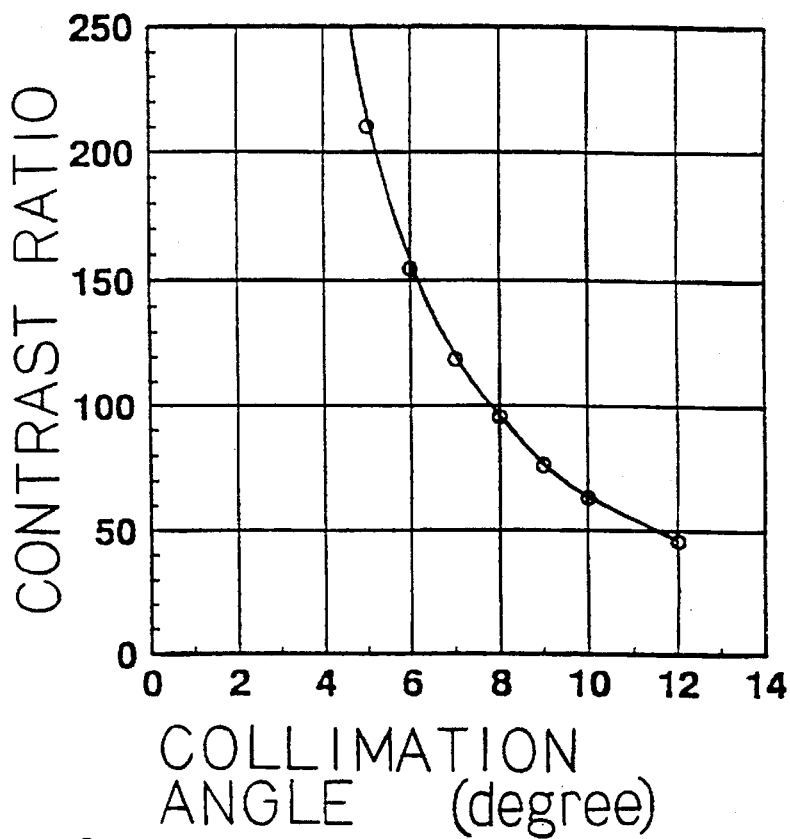
FIG. 31 is a graph of the optical characteristic.
Figure 32:
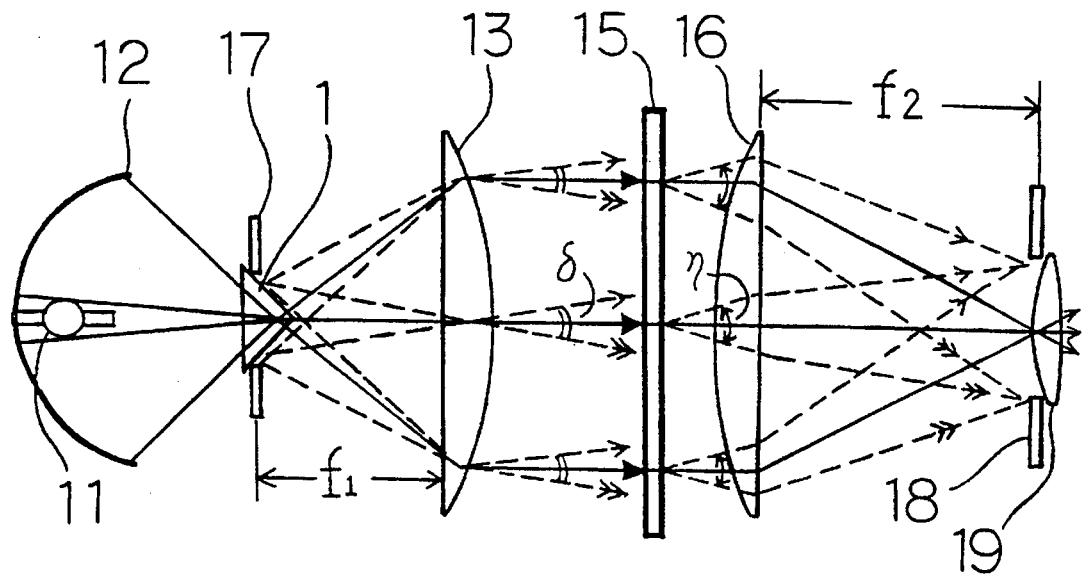
FIG. 32 is a block diagram showing the optical paths.

In the projection display using a transparent-scattering type display element, the typical characteristic between the collimation angle δ and the contrast ratio of projected light on screen is shown in FIG. 5 of the letter which was printed in the proceeding of Japan Display '92 page 114 and these are cited and shown in FIG. 31 and FIG. 32.

When the elliptic mirror is used, non-uniformity in the distribution of illuminance in the plane of the display element may be caused due to a lack of a light component having a small angle with respect to the optical axis of the elliptic mirror at the second focal point. Such non-uniformity can be improved by using the convex cone prism having an apex angle $\alpha_1$ of 90°–175, the concave cone prism having an apex angle $\beta_1$ of 185°–270°, the convex cone-like reflector having an apex angle $\alpha_2$ of 150°–177°, or the concave cone-like reflector having an apex angle $\beta_2$ of 183°–210°. The selection of the above-mentioned cone-like materials is determined depending on the light source, the shape of the elliptic mirror and the display size of the display element.

From the viewpoint of efficiency of light utilization and a distribution of brightness on a projection screen, it is preferable to select the middle or the neighboring portion of each of the angle value ranges. Further, in a plane including the optical axis, it is desirable that a plurality of separated light fluxes incidenting into the incident surface side of the cone-like material are emitted from the light emission side of the cone-like material in an overlapped state. Preferably, more than 60% of light fluxes are overlapped in a plane including the optical axis.

Further, the collimation of the light fluxes can be much improved because only the light passing through the conical surface of the conical-like material and the first aperture means enters into the display element. Further, the second aperture means as means for removing scattering light can remove the scattering light with high efficiency from the light passing through a transparent-scattering type display element, whereby a projection picture image having a high contrast ratio is obtainable.

Further, since the light distribution of the light flux entering into the condenser lens 13 can be regulated depending on the apex angle of the cone-like material disposed at or near the second focal point of the elliptic mirror, light can be effectively collected to the effective area of the display element even when the shape of the display element is other than square. For instance, when the convex cone prism 1 is used for NTSC TV system having an aspect ratio of 3:4 or a high definition TV system having an aspect ratio of 9:16, which has an elliptic shape or a rectangular shape in a plane sectioned by a normal plane to the optical axis, it is preferable that the apex angle in the longitudinal direction is smaller than the apex angle in the traversing direction. For instance, when the concave cone prism 2 is used, the apex angle in the longitudinal direction is larger than the apex angle in the traversing direction. The reflection type cone-like material can be also used in the same manner as above.

In the projection type display apparatus, the area of opening of the first aperture means 17 disposed in the vicinity of the second focal point of the elliptic mirror 12 and the area of opening of the second aperture means 18 disposed to remove scattering light are made variable. For instance, when the circumstance is dark, influence to the screen by the light from the circumstance is little and a dark portion in a projected picture image can be discriminated, and accordingly, it is possible to control the area of openings to obtain a high contrast ratio because of more effective removing of scattering light even though two apertures are throttled to reduce light flux passing therethrough. Then, there is obtainable a clear, visible picture image having a high contrast ratio.

On the other hand, when the circumstance is bright, light from the circumstance passes onto the screen whereby dark portion of a picture image projected by the projection type display apparatus is seen to be bright. In this case, the area of opening of the two apertures are increased to increase light flux to be projected. Then, the screen is made bright, and picture image on the screen has a high contrast ratio, which can be easily seen. Thus, the optimumly projected picture image can be obtained depending on brightness in the atmospheric area by the associated operation of the two apertures.

The typical results were shown in FIGS. 2 to 5 and FIG. 8 of the previously described reference (SID '92 in Japan).

Preferred examples of the present invention will be described. However, the present invention is not limited to the Examples.

EXAMPLE 1

Figure 19:
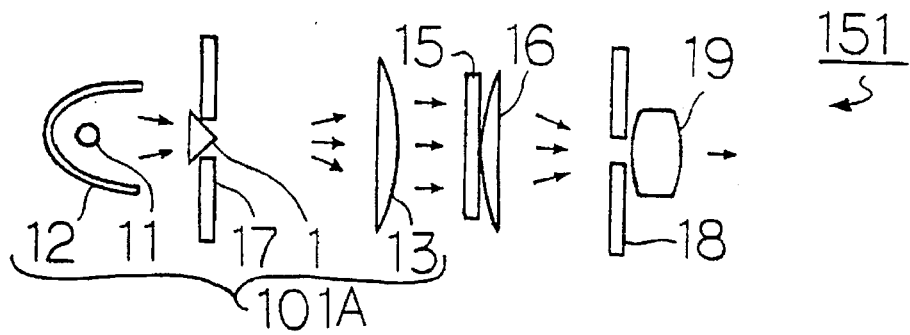
FIG. 19 is a block diagram of the apparatus according to Example 1.

FIG. 19 shows a projection type display apparatus 151 as Example 1. In this Example, light source 11 was disposed at the first focal point of an elliptic mirror 12. Light emitted from the light source 11 was reflected by the elliptic mirror 12 to enter into an incident surface of a transparent type convex cone prism 1 which was disposed substantially at the second focal point of the elliptic mirror 12. At the incident surface, the light was refracted and propagated in it. The light was refracted at and emitted from conical surface of the prism 1 whereby the azimuth of the light fluxes was changed and the light is propagated toward a condenser lens 13. The light fluxes were made substantially parallel by the condenser lens 13. A first aperture 17 was disposed between the convex cone prism 1 and the condenser lens 13. Further, the light in which the flux were aligned to be parallel was passed through a transparent-scattering type display element 15, and was converged by a second condenser lens 16. Then, scattering light was removed by a second aperture 18 as means for removing scattering light. Finally, the unscattered light was projected on a screen (not shown) by means of a projection lens 19.

In the projection type display apparatus 151 in FIG. 19, a projection light source apparatus 101A was constituted by the light source 11, the elliptic mirror 12, the convex cone prism 1 and the first aperture 17. A projection optical system was constituted by the second condenser lens 16 as the second optical converging means, the second aperture 18 and the projection lens 19.

The light source 11 may be a discharge light emission type metal halide lamp, xenon lamp or a filament heating light emission type halogen lamp or the like, having a light shielding portion such as an electrode, a glass bulb, a heat insulating layer, a filament. With such structure, emission light in a portion parallel to the optical axis was small in the light emitted from the source 11, and a component of emission light in a portion parallel to the optical axis was small in the light reflected by the elliptic mirror 12.

In the conventional apparatuses described before, there was a shortage of light having an angle of about 10° or less, the angle being formed with respect to the optical axis of the elliptic mirror 12 at the second focal point. Accordingly, a shadow was resulted at a location near the central portion of the display element 15, or uneven illuminance was resulted in an irradiated surface, or the collimation of the light flux was poor as a whole. This resulted in difficulty of displaying a picture image having a high contrast ratio, or resulted in the reduction of light efficiency of utilization.

In this Example, the azimuth of the light flux after emission was changed due to the refraction of light at the interface between the prism and air to thereby compensate the shortage of light having an angle of about 10° or less to the optical axis. Accordingly, non-uniformity of light flux near the center (in the vicinity of the optical axis) of the display element 15 could be improved, and the illuminance in the entire projection display area of the screen could be uniform.

An angular range of light near the parallel light which is insufficient at a location near the second focal point of the elliptic mirror 12 is changed depending on the shape of the light shielding portion of the light source 11 and the shape of the elliptic mirror 12. Accordingly, the shape of the apex angle of the convex cone prism 1 can be determined optimally depending on the distribution of the angle of light emitted from the light source 11, the shape of the elliptic mirror 12 and the necessary uniformity in the distribution of illuminance in the display element 15. The principle of the determination of the optimum apex angle value will be described later.

In this Example, the display element 15 used is single. However, a mozaic color filter may be used for each pixel, or a plurality of the display elements 15 may be used for each color to thereby effect a full-color display.

Each of the structural elements of this Example will be described.

The display element 15 used in the Example was provided with a liquid crystal and solidified matrix composite in which a nematic liquid crystal having a positive dielectric anisotropy was sealed in a capsule. The length of the diagonal line of the display area of the element 15 was 3.4 inches, the aperture ratio of TFT arrays was 50% and the maximum transmittance of light in a transparent state was 38%.

The light source apparatus was constituted by the light source 11 (a metal halide lamp of 250 W, the length of arc R=5 mm), the elliptic mirror 12 (the first focal length $F_1=15$ mm, the second focal length $F_2=100$ mm, the total length of depth h=50 mm, the diameter of opening=75.8 mm), the convex cone prism 1 (the apex angle $\alpha_1=120°$, the diameter in cross section of the bottom surface=30 mm, the height=12 mm, wherein the height of the slant surface of the cone prism was 8.66 mm), and the condenser lens 13 disposed in front of the display element 15 of a transparent-scattering type (a convex lens of the focal length $f_1=160$ mm). Further, the first aperture 17 (e.g. a single circular opening) having an opening portion of diameter $D_1=17$ mm was disposed in the vicinity of the convex surface of the light emission side of the convex cone prism 1.

Figure 15:
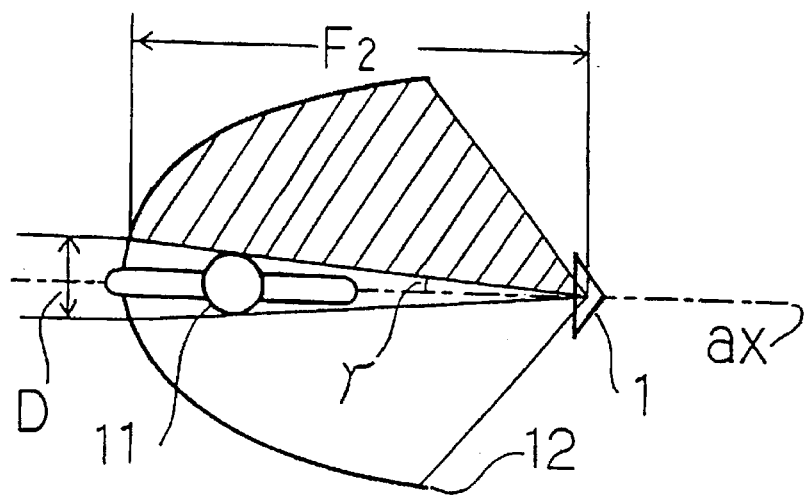
FIG. 15 is an enlarged cross-sectional view of a first part of a light source apparatus in which the convex cone prism is used.
Figure 16:
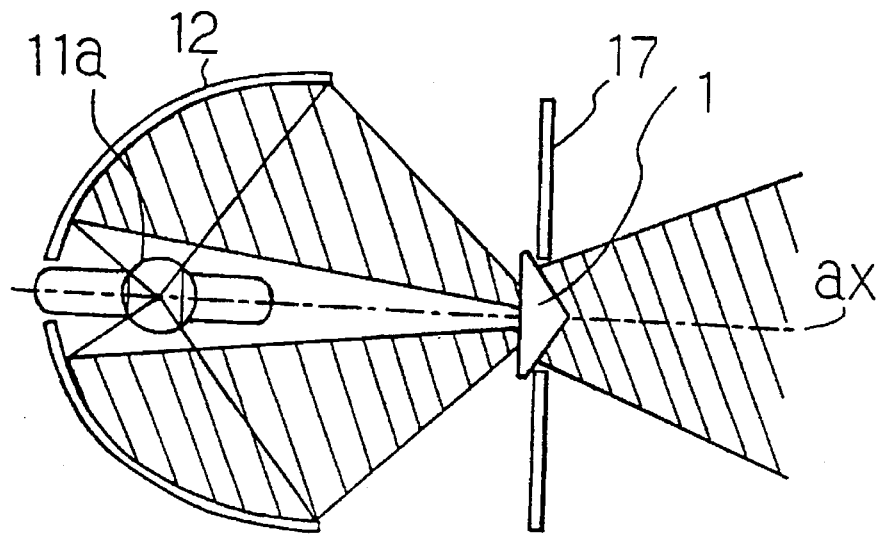
FIG. 16 is an enlarged cross-sectional view of a second part of the light source apparatus in which the convex cone prism is used.

FIGS. 15 and 16 are enlarged views showing parts of the light source apparatus. Owing to the structure of the light emission part 11a of the light source, light can not be emitted in all directions. In particular, there is a shortage of light in the direction of the optical axis. In FIG. 16, a hatched area is the main light path in which light propagates, and it is shown that there is no light path on or near the optical axis at the side of the light emission part 11a in view from the convex cone prism 1. However, the light emitted from the conical surface of the convex cone prism 1 propagates practically as substantially uniform light fluxes, the light fluxes including the optical axis portion.

Turning to FIG. 19, the light which has passed through the convex cone prism 1 and the opening portion of the first aperture 17 entered into the condenser lens 13, which was located 160 mm apart from the convex cone prism 1 on the optical axis, where the divergent light flux were collimated, and then, they were introduced into the display element 15. In the light fluxes transmitting through the display element 15, only the light fluxes passing through the second condenser lens 16 (a convex lens having a focal length $f_2=200$ mm) disposed to remove scattering light and the second aperture 18 (the diameter of opening $D_2=21$ mm) disposed at the focal point of the condenser lens 16, were projected through the projection lens 19 onto the screen to thereby form a picture of liquid crystal display.

With the projection type display apparatus 151, a display image was projected on a 40-inch screen. Table 1 shows distributions of illuminance (center, maximum, periphery: lux), luminous flux (1 m) and contrast ratios on the screen in a dark room. In the Table 1, the conventional apparatus 150A is used as Comparative Example 1, the projection type display apparatus with the light source apparatus in which neither prism nor aperture is used, is used as Comparative Example 2, and Example 4, which will be described later, is shown for comparison.

TABLE 1

|  | Example | | | |
|---|---|---|---|---|
|  | Example 1 | Example 4 | Comparative Example 1 | Comparative Example 2 |
| Conditions |  |  |  |  |
| Prism | Presence | Presence | Absence | Absence |
| Aperture (mm) | 17 | 17 | 17 | Absence |
| Optical performance |  |  |  |  |
| Illuminance (lux) |  |  |  |  |
| Center | 4200 | 4200 | 300 | 1900 |
| Maximum | 4200 | 4200 | 3800 | 4000 |
| Periphery | 2000 | 2000 | 1900 | 1900 |
| Luminous flux (1 m) | 2300 | 2300 | 1500 | 1900 |
| Contrast ratio | $\geq 100$ | $\geq 100$ | $\geq 100$ | 40 |

As is clear from Table 1, the distribution of illuminance of the projected picture image was made uniform. Further, the luminous fluxes (lm: lumen) as accumulated light flux in the screen surface could be increased without deteriorating the contrast ratio. In particular, a shortage of light flux at a position near the center of the screen (a shortage of light flux at a position near the optical axis) as seen in the conventional apparatuses could be improved, and the maximum illuminance could be obtained at the center of the screen, with the result of providing a bright and high contrast projection image with good visibility in a display surface of large screen area.

FIG. 5 is an enlarged cross-sectional view of the convex cone prism 1 and a light path in and near the prism 1. The convex cone prism 1 may be a quadrangle cone, a circular cone or an elliptic cone wherein the shape of a plane taken along in parallel to the incident surface is substantially elliptic. In any type of the prism 1, the shape taken along the optical axis is substantially triangular. However, a convex cone prism 1 having a similar shape may be used as far as it has substantially the same optical function.

In FIG. 5, an incident light A emitted and propagated from the elliptic mirror 12 enters into the bottom surface 1c of the convex cone prism 1 at an incident angle $\gamma_1$ and it is refracted at the bottom surface 1c. Then, the light is emitted with refraction through the emission surface 1a (the incident light B has an incident angle $\gamma_2$ and it is emitted with refraction through the emission surface 1b). The emitted light is rendered to be substantially parallel to the optical axis, and thereafter, it is introduced as an emission light C to the condenser lens 13. It is sufficient that the apex of the cone-like material is in the vicinity of the optical axis, and there may be a slight deflection.

The angle $\alpha_1$ of the apex of the convex cone prism 1 was determined optimally depending on the light distribution which is geometrically emitted from the light source 11, the shape of the elliptic mirror 12, the focal length of the condenser lens 13, the size of the display area of the display element 15 and the effective F number of the projection optical system. The top of the apex angle $\alpha_1$ is located on or in the vicinity of the optical axis, and the bisector line of the apex angle $\alpha_1$ substantially agrees with the optical axis.

Any light transmitting material may be used for the convex cone prism 1. It is desirable to form an anti-reflection film on the light incident surface (bottom surface 1c) and light emission surface (convex surfaces 1a, 1b) to reduce a loss of light energy which is caused by reflection at the surface. Further, it is preferable to form the filters on the surface of optical glass which has been optically polished, being of a nature of transmitting light having specific wavelength ranges, but reflecting or absorbing needless light. For instance, an infrared ray cut filter which transmits visible light but reflects heat rays or a ultraviolet ray cut filter.

Figure 6:
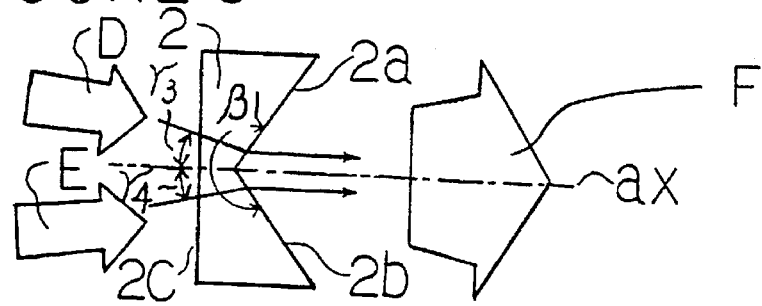
FIG. 6 is a diagram showing a light path in the vicinity of a concave cone prism.

FIG. 6 shows a case of using the concave cone prism 2 wherein the apex angle $\beta_1$ is formed of a convex surface. Specifically, the concave cone prism 2 has an apex angle $\beta_1$ in a range from 185° to 270°. Further, it may be a concave circular cone, a concave pyramidal cone or a concave elliptic cone where the shape of a plane taken along in parallel to the bottom surface is substantially elliptic. In the same manner as described with respect to the convex cone prism 1, an incident light D and an incident light E obliquely enter into the bottom surface 2c at incident angles $\gamma_3$, $\gamma_4$ with refraction, and they are refracted at the emission surfaces 2a, 2b. The emitted light fluxes as emission light F are substantially in parallel to the optical axis. A concave cone prism having a circular cone portion or a regular square cone portion is easy to process. However, it is not always that the shape in cross section of the prism taken along a normal plane to the bisector line of the apex angle of the cone-like material is circular or square, but it may be an elliptic shape or a rectangular shape. In this case, the value of the apex angle of the cone-like material is not single, but the apex angle has a plurality of values or a distributed value as described above.

The convex cone prism 1 or the concave cone prism 2 disposed at the second focal point of the elliptic mirror 12 can utilize only light collected to a location near the second focal point and can eliminate a shortage of light near the optical axis, which has an angle of about 10° or less to the optical axis. As a result, the distribution of light flux in the plane of the transparent-scattering type display element 15 could be uniform.

In particular, it is preferable to dispose a stop means so that light from the portion other than the effective surface of the convex cone prism 1 does not reach the condenser lens 13 or the light is interrupted.

In the determination of the dimensions of each portion of the convex cone prism 1 or the concave cone prism 2, the bottom surface area of the prism which define the amount of the light fluxes entering into the prism at the location near the second focal point and the effective surface area of the aperture are determined in consideration of the size of the light source 11 and the elliptic mirror shape, a desired brightness to be obtained and the contrast ratio and so on. Generally, when parallel light fluxes are to be obtained as shown in FIG. 19, it is preferable that $D_1/f_1=0.04-0.21$ where $D_1$ is a diameter of the effective surface area of the prism or the average diameter of the opening portion of the first aperture 17 which restrict the amount of the light fluxes at the second focal point, and $f_1$ is the focal length of the condenser lens 13.

As other structural elements, the projection light source system may be provided in combination with a plane reflection mirror, an optical fiber, a fiber array plate, a lens, a cooling system, an infrared ray cut filter, a ultraviolet ray cut filter and so on as far as they do not reduce the effect of the present invention.

As further structural elements, power supply, control circuit, light sensor, temperature sensor and so on are used in this present invention.

As the projection optical system, a conventionally used lens can be used. The projection optical system is preferably so constructed that only transmitting light without scattering among the light emitted through the display element 15 is projected on the screen while the transmitting light with scattering is removed.

The simplest structure is that a projection lens is disposed in rear of the display element 15. If necessary, a condenser lens, a reflecting mirror may be used. However, such structure can not sufficiently eliminate the scattering light unless the distance between the display element 15 and the projection lens is prolonged. Accordingly, it is not practical. Therefore, it is preferable to add means for removing the scattering light. Specifically, the light which has passed through the display element 15 without scattering is converted by a suitable means and the second aperture 18 is disposed to the focal point. The second aperture 18 may be a perforated aperture which is similar to the first aperture 17 of the projection light source system as described above, or a small mirror.

In a case of using the aperture, the opening is used as the opening portion which allows a linear transmitting light (the light transmitting through pixel portions in a transparent state) to pass through. In a case of using the small mirror, the reflecting surface constitutes the opening portion which allows only the linear transmitting light to pass through it by the reflection at the reflecting surface. In either case, scattering light (light scattered at pixel portions in a scattering state) does not reach the focal point and is substantially removed. Thus, only the linear transmitting light necessary to form a picture image is projected.

The diameter $D_2$ of the opening portion of the second aperture can be determined in consideration of a desired brightness to be obtained, the contrast ratio and so on. It is preferable that the diameter of the opening portion can be changed so that the aperture is adjustable. Generally, when the condenser lens 16 (focal length $f_2$) which is used as the second light converging means and the second aperture 18 (average diameter $D_2$ of the opening portion) are used as shown in FIG. 19, it is preferable that the ratio $D_2/f_2$ is equal to or a little greater than the ratio $D_1/f_1$.

Figure 21:
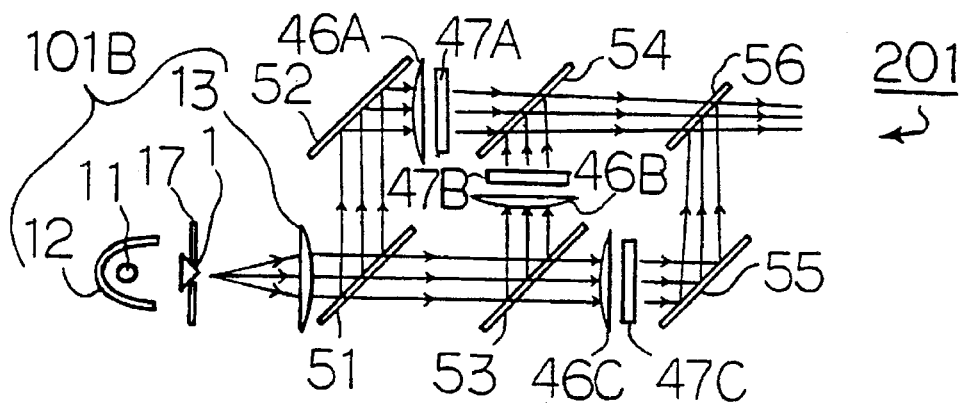
FIG. 21 is a block diagram of the apparatus according to Example 2.

When a plurality of the display elements are used for different colors, the light transmitted through the display elements may be synthesized with dichroic prisms or dichroic mirrors or the like before the projection as shown in FIG. 21. Alternatively, the different colored light individually projected is synthesized on a screen. However, in the former case, only one optical axis and only one projection lens are respectively used, such measures being advantageous for needs of a small portable type and zooming.

The means for removing scattering light can be disposed between the transparent-scattering type display elements 47A, 47B, 47C and the screen. Therefore, it may be disposed in the light path after the color synthesization as shown in FIG. 21, or it may be disposed just behind the respective transparent-scattering type display elements 47A, 47B, 47C in combination with each condenser lens whereby the colored light is synthesized and projected after the scattering light has been removed.

The transparent-scattering type display element used for the present invention may be a flat plane type display element which assumes a transparent state and a scattering state depending on the application of a voltage. In more detail, there are a DSM (dynamic scattering mode) liquid crystal display element, a liquid crystal display element using a liquid crystal and solidified matrix composite wherein liquid crystal is dispersed and held in a solidified matrix such as resin so that transparent and scattering states are controlled by bringing the refractive index of the liquid crystal in agreement with or disagreement from that of the solidified matrix, or an element wherein fine needle-like particles are dispersed in solution, and transparent and scattering states are controlled depending on the application of a voltage.

Among these, the liquid crystal display element using a liquid crystal and solidified matrix composite exhibits excellent voltage-transmittance (VT) characteristics and is easy to manufacture. Further, a commercially available driver IC can be used. The liquid crystal and solidified matrix composite can electrooptically operate by matching the refractive indices by using a voltage control method. Further, a normally transparent portion can be produced.

Further, it is preferable to use such a liquid crystal and solidified matrix composite that a nematic liquid crystal having a positive dielectric anisotropy is included in it and the refractive index of a solidified matrix is substantially in coincidence with the ordinary refractive index ($n_0$) of the liquid crystal used whereby a high transmittance is exhibited when a voltage is applied, and a portion between pixels without having an electrode becomes a scattering state (a dark portion is produced on a screen when light is projected). Accordingly, the contrast ratio of a projected picture image becomes high even though a light blocking layer is not formed between the pixels. Further, a liquid crystal and solidified matrix composite of reverse mode can be used.

The liquid crystal and solidified matrix composite may be of a micro-capsule type or have such a construction that the vacuoles of the liquid crystal are completely communicated or partially communicated through fine gaps in the same manner as a porous material. In a method of preparing the liquid crystal and solidified matrix composite, the liquid crystal is mixed with material for forming the solidified matrix, the mixture is cured by a photo-curing, heat-curing or removing solvent, or curing by reaction to thereby separate the solidified matrix.

In particular, a solidified material of photo-curing or heat-curing type is advantageous because the display element can be formed in a closed system. In more detail, a photo-curing vinyl series resin, e.g. a photo-curing acryl series resin is preferably used. In particular, it is preferable to contain acryl oligomer which is polymerized and cured by irradiation of light.

Further, a spacer such as ceramic particles, plastic particles, glass fibers or the like for controlling the gap between the substrates, pigment, coloring matter, a viscosity adjusting agent, an additive which does not adversely effect the performance of the present invention may be added to a layer of the liquid crystal and solidified matrix composite.

The response time of the liquid crystal display element using the above-mentioned liquid crystal and solidified matrix composite has a rising time on the application of voltage of about 3–50 msec and a falling time on the removal of the voltage of about 10–80 msec, which are faster than the conventional TN type liquid crystal display element. Further, it has a desirable VT characteristic for gradation display driving. In addition, a high light transmission characteristic and scattering function can be obtained.

The volume fraction $\xi$ of the liquid crystal operable in the liquid crystal and solidified matrix composite is preferably $\xi > 20\%$, more preferably $\xi > 35\%$ from the viewpoint of the scattering function in a non-voltage application time. On the other hand, when $\xi$ is too large, stability in the structure of the liquid crystal and solidified matrix composite becomes inferior. Accordingly, $\xi < 70\%$ is desirable.

the liquid crystal and solidified matrix composite is held between a pair of substrates with an electrode. The liquid crystal display element using the liquid crystal and solidified matrix composite has some difficulty in combination of a multiplex driving characteristic. Accordingly, when the liquid crystal display element having a large number of pixels is formed, an active element is disposed for each of the pixels. In a case of using another transparent-scattering type display element, the active element is disposed if necessary. When a three-terminal element such as a TFT (thin film transistor) is used as the active element, a flat electrode which is used commonly for all pixels is formed for one substrate with an electrode. However, a two-terminal element such as a MIM element, a PIN diode or the like is used, the one substrate with an electrode is patterned in a stripe form.

When the TFT is used as the active element, silicon is preferably used for a semiconductor material. In particular, polycrystalline silicon is preferable because it has less photosensitivity as non-crystalline silicon has, and it eliminates erroneous operation even using a smaller area light blocking layer which interrupts light from the light source. When the non-crystalline silicon is used, the light blocking layer is used.

The electrode used is generally a transparent electrode. However, when it is used for a reflection type liquid crystal display element, a reflection electrode of chromium, aluminum or the like can be used. In the projection display apparatus, the transparent-scattering type display element is used, as described before, as a transmissive type display element, so that light is projected on a screen which is separately provided. In this case, the projection type display apparatus may be of a front projection type (a viewer sits on the side of the projection type display apparatus) or a rear projection type (a viewer sits at the opposite side of the projection type display apparatus).

Further, a reflecting projection type display apparatus wherein emission light is introduced to a light incident side to project it, can be formed by using a reflection type liquid crystal display element in which an element provided with a reflecting electrode or a reflection layer is provided in the rear of a display element. The transparent-scattering type display element can be used as a transparent-scattering type display having flat electrode covering all pixels, a transparent-scattering type display element in which a simple electrode patterning is conducted, or it can be used for a projection type display apparatus. Further, they can be used as illuminating apparatuses.

For instance, when the projection type display apparatus 151 having the construction as shown in FIG. 19 is disposed by embedding it in a wall or a ceiling, a high speed dimmer is obtainable without changing color.

Further, the projection type apparatus 201 having the construction shown in FIG. 21 is disposed by embedding it in a wall or a ceiling, a high speed dimmer is obtainable, or a dimmer with a change of color is obtainable.

EXAMPLE 2

As shown in FIG. 21, dichroic mirrors 51, 53, and metallic mirrors 52 were used to separate light from the light source into three colors R, G and B. Transparent-scattering type display elements 47A, 47B, 47C formed of the liquid crystal display elements which were the same as used in Example 1 were disposed for the respective colors. Condenser lenses 46A, 46B, 46C were disposed in front or rear of the display elements. The light passing through the display elements were collected by the condenser lenses and synthesized by the dichroic mirrors 54, 56 and metallic mirror 55. The light was projected on a screen by means of an aperture stop disposed at the focal point of the condenser lenses and a projection lens (not shown).

In this case, the shape of the display portion of the transparent-scattering type display elements 47A, 47B, 47C was rectangular wherein the aspect ratio was 9:16 which is in accordance with a specification for high definition TV and the shape of the bottom surface of the convex cone prism 1 was elliptic wherein the aspect ratio was 9:16 and the apex angle in the lateral direction of the prism 1 was 120°. In order to reduce the deterioration of chromaticity due to PS polarization, one or more color filters were used additionally for the transparent-scattering type display elements 47A, 47B, 47C.

As a result, even when the aspect ratio of the shape of the display portion was 9:16 as the specification of high definition TV, a light loss at the peripheral portion could be suppressed and the substantially the same uniform distribution of illumination on the screen as Example 1 could be obtained.

In the following, the relation of the shape and the angle of the convex cone prism 1 or the concave cone prism 2 used for the present invention will be described.

The cone prism actually used has a three-dimensional structure. In consideration of the behavior of light in and around the prism, it is sufficient to consider the propagation of light in a plane including the axially symmetrical axis of the cone prism (usually the axially symmetrical axis is substantially in agreement with the optical axis of a projection display apparatus).

Figure 14:
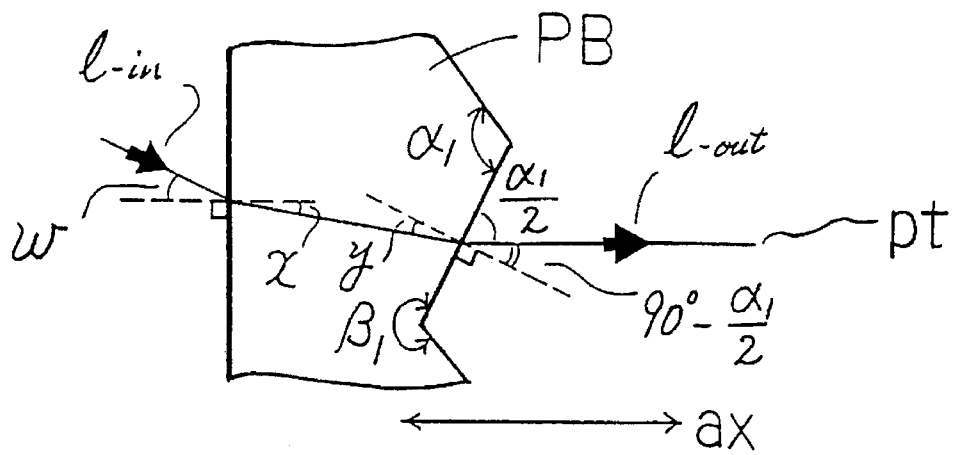
FIG. 14 is a diagram showing a light path in a transparent type cone-like material.

In FIG. 14, light l-in enters into a prism block PB from the left side; is refracted at the incident surface; is refracted at the emission surface, and light l-out is emitted through the prism. In this case, the incident light entering into the prism at an incident angle $\omega$ is refracted in it and transmitted through the same and propagates along a light path pt. In an example, it is assumed that the light path pt is in parallel to the optical axis. In FIG. 14, $\omega$: an incident angle to the prism, x: a refraction angle at the incident surface side, y: an incident angle to the emission surface in view of the emission surface side in the prism, $\alpha_1$: the apex angle of the convex prism (a bisector line of $\alpha_1$ is in parallel to the optical axis, and ideally, they agree with each other), $\beta_1$: the apex angle of the concave prism ($\alpha_1+\beta_1=360°$) and n: the refractive index of the cone-like prism.

Then, the following equations are established by the Snells's law.

| Formula (1) |
| --- |
| $\sin(\omega) = n \cdot \sin(x)$ |
| $\sin(90° - \alpha_1/2) = n \cdot \sin(y)$ |
| $x + y = 90° - \alpha_1/2$ |
| $\cos(\alpha_1/2) = n \cdot \sin(y) = n \cdot \sin(90° - \alpha_1/2 - x)$ |
| $= n \cdot \cos(\alpha_1/2 + x)$ |
| $= n \cdot \cos(\alpha_1/2) \cdot \cos x - n \cdot \sin(\alpha_1/2) \cdot \sin(x)$ |
| $= [(n^2 - n^2 \cdot \sin^2(x))^{1/2}] \cdot \cos(\alpha_1/2)$ |
| $- \sin(\alpha_1/2) \cdot \sin(\omega)$ |
| $= [(n^2 - \sin^2(\omega))^{1/2}] \cdot \cos(\alpha_1/2)$ |
| $- \sin(\alpha_1/2) \cdot \sin(\omega)$ |
| $(1 + \sin(\omega) \cdot \tan(\alpha_1/2))^2 = n^2 - \sin^2(\omega)$ |
| $\sin^2(\omega) \cdot \tan^2(\alpha_1/2) + 2 \cdot \sin(\omega) \cdot \tan(\alpha_1/2)$ |

As a result, the relation of Formula (2) is established.
Formula (2)

$\tan(\alpha_1/2) = [(n^2 - \sin^2(\omega))^{1/2} - 1] / \sin(\omega)$

In the Formula (2), physical characteristic values can be determined by material to be used. Table 2 shows data for n=1.5 wherein borosilicate glass or plastics is used, and Table 3 shows data for n=1.8 wherein frint glass is used. $\omega$ represents incident angle and $\alpha_1$ represents a value of the apex angle of the convex prism. In this present invention, the refractive index of transparent prisms is preferably in the range of 1.45–1.65.

TABLE 2

| $\omega$ | 3° | 5° | 10° | 15° | 20° | 25° | 30° |
| --- | --- | --- | --- | --- | --- | --- | --- |
| $\alpha_1$ | 168° | 160° | 141° | 123° | 107° | 92° | 79° |

TABLE 3

| $\omega$ | 3° | 5° | 10° | 15° | 20° | 25° | 30° |
| --- | --- | --- | --- | --- | --- | --- | --- |
| $\alpha_1$ | 173° | 168° | 155° | 143° | 132° | 121° | 100° |

When the elliptic mirror 12 is used as a light collecting mirror and the light source 11 is disposed at the first focal point, light converged by the reflection surface of the elliptic mirror 12 and collected to the second focal point is introduced into the cone prism disposed at the position of the second focal point. In this case, there is the relation of Formula 3 in the light source apparatus as shown in FIG. 15.

The diameter of the light emission bulb of a practical light source is generally in a range of 10–30 mm, and accordingly, the value D which represents a light shielding diameter in FIG. 15 has a similar value. Accordingly, in the distribution of orientation of light entering into the cone-like material, the region having an angle smaller than γ of the light with respect to the optical axis, where there is no light, is given by the Formula (3).

Formula (3)

$$\tan(\gamma) = D/(2 \cdot F_2)$$

Since the second focal length $F_2$ of the elliptic mirror 12 practically used is in a range of about 50–200 mm, γ assumes about 3°–30° from the Formula (3). Practically, the value γ is preferably controlled to be small. A case of γ=30° which is determined in combination of D=30 mm and $F_2$=50 mm is not practical.

When considering a case of ω=γ in the relation of the incident angle ω and $\alpha_1$ shown in Tables 2 and 3, it is understood that the value of the apex angle $\alpha_1$ of the convex cone prism 1 is preferably in a range of 90°–175°. Also, a preferable range in a case of the concave cone prism 2 is 185°–270°. Here, description has been made as to a case that light emitted from the cone prism is in parallel to the optical axis. However, it is sufficient to use a prism which causes the refraction of incident light so that a shortage of the distribution of orientation of light flux near the optical axis can be eliminated.

EXAMPLE 3

The same projection type display apparatus as used in Example 1 was used except that for the light source apparatus, an elliptic mirror 12 (the first focal distance $F_1$=20 mm, the second focal distance $F_2$=105 mm, the entire length of depth h is 50 mm, the diameter of opening=90 mm, and the diameter of the hole for receiving a lamp=11 mm), a convex cone prism 1 (the apex angle $\alpha_1$=114°, the diameter of the bottom surface =30 mm, the height=12 mm, wherein the height of the slanted surface of the cone prism is 9.74 mm) and a condenser lens 13 (double convex lens having a focal length $f_1$=169 mm) which is disposed in front of the transparent-scattering type display element 15, were used.

On the bottom surface and the convex surface of the convex cone prism 1, anti-reflection films for a wavelength band region of visible light were formed. The condenser lens 13 was constituted by a plano-convex lens of glass of BK7 having a focal length of 1000 mm and a plano-convex lens having a focal length of 200 mm wherein an ultraviolet ray absorbing film of an organic material is interposed between opposing flat surfaces of the two plano-convex lenses with an optical bonding agent. Thus prepared condenser lens 13 was so disposed that the plano-convex lens having a focal length of 1000 mm was directed to the light incident side and the plano-convex lens having a focal length of 200 mm was directed to the light emission side.

With the above-mentioned construction and arrangement, the aberration as seen in a single spherical lens could be reduced, the interface between the ultraviolet ray absorbing film and air could be eliminated and the problem of the reduction of light efficiency due to reflection of light at the interface (about 8%) could be overcome. Further, a first aperture 17 having an opening portion whose diameter is 17.7 mm was used in the vicinity of the convex surface of the convex cone prism 1 at its light emission side.

With the projection type display apparatus of Example 2, there was found an increment of about 10% in the light fluxes projected on the screen. In this case, a model of a three-dimensional emitter was prepared in accordance with the measurement of the distribution of light emitted from a metal halide lamp of 250 W and a length of emission part 5 mm. Luminous fluxes reaching the screen and distribution of illuminance on the display element were calculated by a ray tracing method in a case that the liquid crystal display element was in a transparent state.

As variables, the shape of the elliptic mirror 12 (the ratio $F_2/F_1$ of the first and second focal length $F_1$, $F_2$), the apex angle $\alpha_1$ of the convex cone prism 1 and the focal length $f_1$ of the condenser lens 13 were selected.

The first focal length $F_1$ of the elliptic mirror 12 was determined to be about 10–30 mm and the entire length of the depth h was to be h=2·($F_1$+$F_2$). Calculation was made as to the length of the diagonal line of the display of the liquid crystal display elements having an aspect ratio of 3:4. As a result, it was found that desirable luminous fluxes could be obtained on the screen in value ranges shown in FIG. 4. However, with respect to the liquid crystal display element having a diagonal size of 10 inches, a case of $f_1$=400 mm is shown.

TABLE 4

| Length of diagonal line of display area | $F_2/F_1$ | $f_1$ | $\alpha_1$ |
| --- | --- | --- | --- |
| 2.4 Inches | 4–5.5 | 100–140 mm | 120–150° |
| 3.4 Inches | 4.5–6 | 130–200 mm | 100–120° |
| 4.4 Inches | 4.5–6 | 130–200 mm | 120–140° |
| 10 Inches | 6.5–7.5 | 400 mm | 110° |

Figure 9:
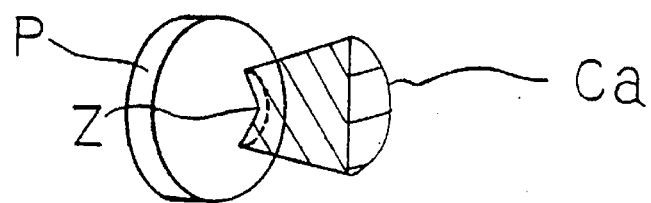
FIG. 9 is a perspective view showing a relation of a convex circular cone type cone-like material to emission light.
Figure 10:
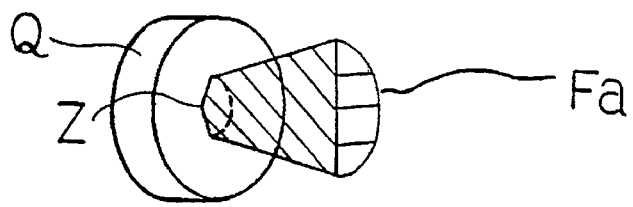
FIG. 10 is a perspective view showing a relation of a concave circular cone type cone-like material to emission light.

FIGS. 9 and 10 are respectively perspective views of circular cone material. FIG. 9 shows a convex cone material P having a convex circular cone shape wherein an example of the propagation of emission light Ca is shown. FIG. 10 shows a concave cone material Q wherein an example of the propagation of emission light Fa is shown.

Figure 11:
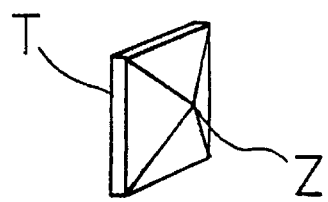
FIG. 11 is a perspective view of a convex pyramidal cone type cone-like material.
Figure 12:
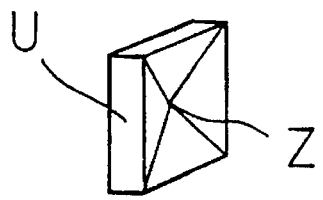
FIG. 12 is a perspective view of a concave pyramidal cone type cone-like material.

FIG. 11 is a perspective view of a convex pyramidal cone, and FIG. 12 is a perspective view of a concave pyramidal cone. In Figures, a character Z indicates the apex of the cone-like material. The emission light is shown in a form of model in a plane including the optical axis and a plane perpendicular to the optical axis. In a case of a transparent type cone-like material, the axially symmetrical axis or the rotationally symmetrical axis of the cone-like material is substantially in agreement with the optical axis of the apparatus.

In the following, description will be made as to a light source apparatus and a projection type display apparatus in which a reflection type cone-like material is used according to the present invention, with reference to FIG. 20.

A light source apparatus 102A comprises an elliptic mirror 12, a light source 11, a cone-like reflector 10 having a convex surface or a cone-like reflector 20 having a concave surface, and a condenser lens 13.

Although the convex or concave type cone-like reflector should be disposed at the second focal point of the elliptic mirror 12 in the same manner as the transparent type cone prism in consideration of obtaining the optimum efficiency, it may be disposed at a position shifted from the front side or rear side of the second focal point or the optical axis. Strictly, the optimum position of the cone-like reflector is determined by the light distribution from the light source 11. The position is changed depending on whether or not the first aperture 17 is provided. The concave type reflector can be disposed at a position slightly away from the elliptic mirror 12 in comparison with the position of the convex type reflector. It is only sufficient to produce uniform light fluxes to the display element 15.

In the convex or concave type cone-like reflector, light can be effectively utilized in the same manner as the case of the transparent type prism. Further, a substantial amount of reflection light is returned to the light source as the case of using a spherical surface mirror. Accordingly, there is a small light loss due to the interruption of reflection light by the light source whereby efficiency of utilization of light is improved.

It is further preferable that light reaching a surface portion other than the effective reflection surface of the convex or concave cone-like reflector does not reach the condenser lens 13. The first aperture 17 may be additionally provided at a position near the second focal point of the elliptic mirror 12 and between the cone-like reflector and the condenser lens 13, if necessary.

Further, a component of light which deteriorates the collimation of light can be removed to align light fluxes in the same manner as the transparent type cone-like material described before. Further, needless light reaching the screen in a case that the transparent-scattering type display element is in a scattering state can be reduced and the contrast ratio can be improved. In addition, heat rays can be removed by forming a cold mirror on the conical surface as the reflection surface.

The following description concerns general function of the cone-like reflector. Although the actually used cone-like reflector has a three-dimensional structure, it is sufficient to consider a case that light beams are in a plane including the axially symmetrical axis or rotationally symmetrical axis of the cone-like reflector.

Figure 17:
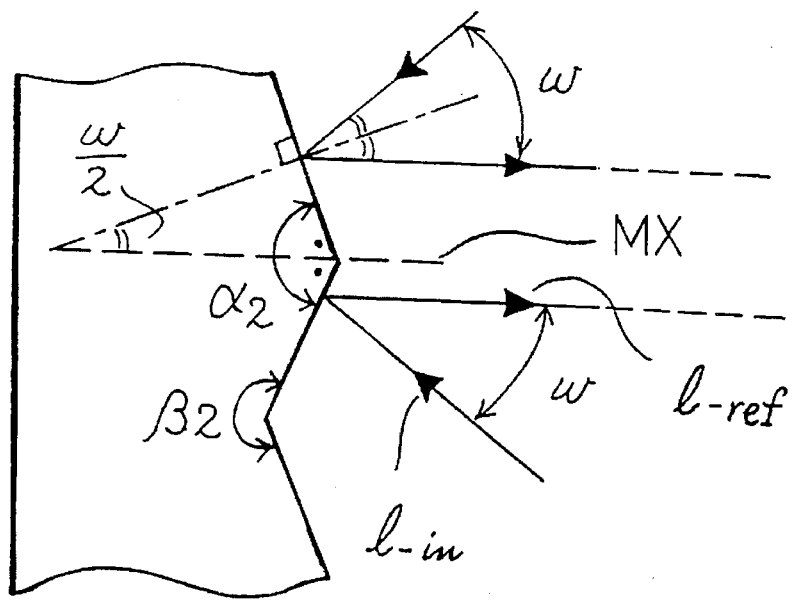
FIG. 17 is a diagram showing a light path in a reflection type cone-like material.
Figure 18:
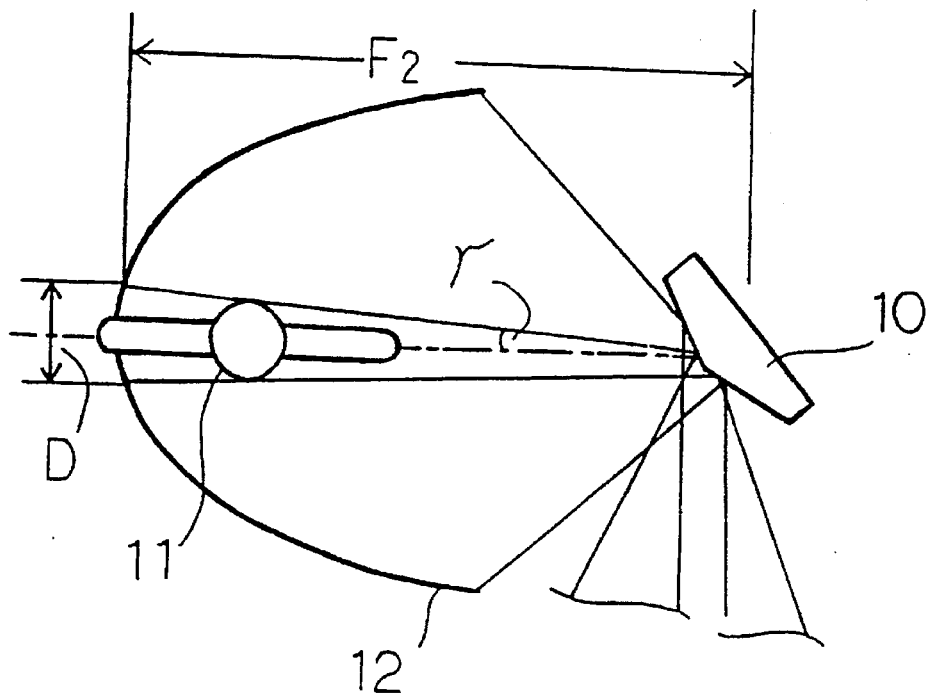
FIG. 18 is an enlarged cross-sectional view of a part of a light source apparatus in which a convex cone-like reflector is used.

Assuming that light incidents at an incident angle $\omega$ to the symmetrical axis of the apex angle of the cone-like reflector and the light is reflected on a surface of the cone-like reflector in parallel to the symmetrical axis of the apex angle of the reflector, as shown in FIG. 17. For convenience, drawing is so made as to coincide the symmetrical axis of the apex angle of the surface of the reflector with the optical axis.

When the apex angle in a plane formed by sectioning the reflector is taken as $\alpha_2$ in a case of the convex type cone-like reflector, and is taken as $\beta_2$ in a case of the concave type cone-like reflector respectively, the slant angle of the side surface of the reflector to the symmetrical axis of the apex angle is $\alpha_2/2$ or $180°-\beta_2/2$. The apex angle $\alpha_2$ of the convex type cone-like deflector which satisfies the above condition is expressed by the following Formula (4).

Formula (4)

$$\omega + \alpha_2 = 180°$$

In the light source apparatus of the present invention wherein the elliptic mirror 12 is used as a light converging mirror, the light emission part of the light source 11 is disposed at the first focal point and the above-mentioned cone-like deflector is disposed in the vicinity of the second focal point to which the light reflected by the reflection surface of the elliptic mirror 12 is focused. $F_2$ represents the second focal length and D represents a light shielding diameter which is defined by a shielding material to the light source or an opening formed in the bottom of the elliptic mirror. In this case, if the light beams having an incident angle of $\gamma$ or less to a plane perpendicular to the optical axis in incident light to the cone-like reflector does not exist, the relation among $\gamma$, $F_2$ and D is shown in Formula (5).

Formula (5)

$$\tan(\gamma) = D/(2 \cdot F_2)$$

The diameter of the light emission bulb of the light source 11 practically used is about 10 mm –30 mm, and the value of D is considered to be in that range. The second focal length of $F_2$ of the elliptic mirror 12 practically used is about 50 mm–200 mm. Accordingly, the incident angle $\gamma$ is in a range of $\gamma = 3°-30°$ from the Formula (5).

In a case of $\omega = \gamma$ in the Formula (4), the apex angle $\alpha_2$ of the cone-like reflector which compensates light beams in an angle area of $\gamma$ or less in which no light beams exist was calculated with respect to each $\gamma$ value. A result is shown in Table 5.

TABLE 5

| $\omega$ | 3° | 5° | 10° | 15° | 20° | 25° | 30° |
|---|---|---|---|---|---|---|---|
| $\alpha_2$ | 177° | 175° | 170° | 165° | 160° | 155° | 150° |

From Table 5, it is understood that the desired range of the apex angle $\alpha_2$ is in a range of 150°–177° in a case of using the convex cone-like reflector 10.

In a case of using the concave type cone-like reflector 20 wherein $\beta_2 = 360° - \alpha_2$, the desirable range of the apex angle $\beta_2$ is 183°–210°.

FIG. 17 shows a case that light reflected by the cone-like reflector is in parallel to the optical axis. However, it is sufficient that the cone-like material has a shape which reflects incident light so as to compensate a shortage of the distribution of orientation of light fluxes near the optical axis.

In the cone-like reflector, the spread angle of light entering into the condenser lens 13 can be adjusted depending on the apex angle of the reflector in the same manner as the transparent type cone prism. Accordingly, light can be effectively collected to the surface of the display element even when the shape of the display element 15 is other than square. Further, since a light source apparatus using the cone-like reflector can collimate light fluxes and remove scattering light more effectively in combination with a scattering light rejection mean, a projected picture image having a high contrast ratio can be obtained.

Further, in the cone-like reflector, the apex angle in the longitudinal direction and the apex angle in the lateral direction can be adjusted in correspondence to the aspect ratio of a picture in either case of the convex type reflector or the concave type reflector, in the same manner as the transparent type cone-like material. Further, the reflection surface can be changed, the detail will be given later.

A displayed picture image having a suitable contrast ratio and brightness for human eyes could be obtained by making the opening portions of the first aperture 17 and the second aperture 18 variable, depending on an ambient circumstance of illumination.

EXAMPLE 4

Figure 20:
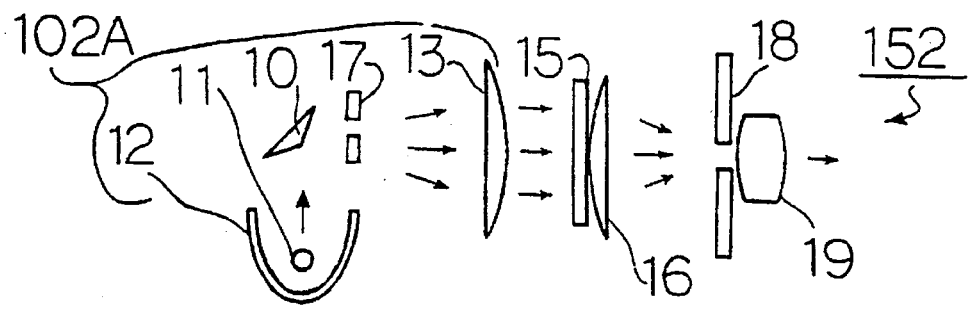
FIG. 20 is a block diagram of the apparatus according to Example 4.

FIG. 20 shows a projection type display apparatus 152. The basic structure is the same as those of other Examples. Accordingly, only different parts are described.

In this Example, a convex cone-like reflector 10 is used as the cone-like material. Light from the elliptic mirror 12 is reflected on the reflection surface of the mirror whereby a distribution in the azimuth angle of light fluxes after the reflection is changed and the light fluxes are introduced in the condenser lens 13 by which they are rendered to be substantially parallel light fluxes. The first aperture 17 may be provided if required.

The light source 11 used in this Example may be such one used for the transparent type cone material described before, or may be one capable of emitting a strong luminous energy.

Even in this Example, the azimuth angle of light fluxes is changed by the reflection of light on the reflection surface, a shortage of light having an angle of about 10° or less to the optical axis can be compensated, whereby non-uniformity of the illuminance at or near the center of the display element 15 can be uniform.

The shape of the apex angle of the cone-like reflector can be formed to have the optimum value depending on the light distribution from the light source 11, the shape of the elliptic mirror 12, and the display size of the transparent-scattering type display element 15 as well as the desired uniformity for the illuminance distribution on it.

In this Example using the cone-like reflector, the optical axis of the apparatus is changed depending on the position and the direction of the optical system comprising the condenser lens 13~the second condenser lens 16, whereby the effective diameter of the reflection surface of the cone-like reflector can function as an aperture stop.

Each constituent part of the projection type display apparatus 152 of this Example will be described.

The length of the diagonal line of the display part of the display element 15 was 3.4 inches, the opening degree of the TFT was 50% and the maximum transmittance of the transparent-scattering type display element 15 was 38%.

A light source apparatus 102A was constituted by the light source 11 (a metal halide lamp of 250 W having a length of emission arc R=5 mm), the elliptic mirror 12 (the first focal length $F_1$=15 mm, the second focal length $F_2$=100 mm, the entire length of the depth h=50 mm, the diameter of opening=76.8 mm), the convex cone-like reflector 10 (the apex angle $\alpha_2$=165°, the diameter of the bottom surface in cross section=30 mm, and the height=12 mm wherein the length of the slant surface of the cone-like reflector was 1.97 mm) and the condenser lens 13 (convex lens having the focal length $f_1$=160 mm) which is disposed in front of the display element 15.

The first aperture 17 having an opening portion of 17 mm in diameter is disposed in the vicinity of the convex surface of the convex cone-like reflector 10 if necessary. It is preferred that the first aperture 17 is formed to have its opening portion in an elliptic shape, a circular shape, a rectangular shape or a square shape so as to meet the shape of the display element 15.

The condenser lens 13 was disposed at a position 160 mm apart from the convex cone-like reflector 10 on the optical axis so that light fluxes passing through the first aperture 17 were rendered to be parallel light fluxes, and the parallel light fluxes were introduced into the transparent-scattering type display element 15 formed of a liquid crystal display element.

The display element 15 in which a nematic liquid crystal having a positive dielectric anisotropy the liquid crystal is sealed in capsules was used. In the light passing through the display element 15, only portion of the light which has passed through the condenser lens 16 (a convex lens having the focal length $f_2$=200 mm) disposed as the second light converging means and the second aperture 18 (the diameter of opening $D_2$=21 mm) disposed at the focal point to remove scattering light, was projected on a screen through the projection lens 19 to form a liquid crystal display picture image.

The distribution of illuminance (center, maximum and periphery) of the light fluxes and the contrast ratio on a 40-inch screen in a dark room in a case of using the projection type display apparatus 152 to project a display on the screen, were calculated. The result of the calculation is shown in Example 4 in Table 1. From the data, it is understood that use of the cone-like reflector can function in the same manner as the transparent cone prism.

Figure 7:
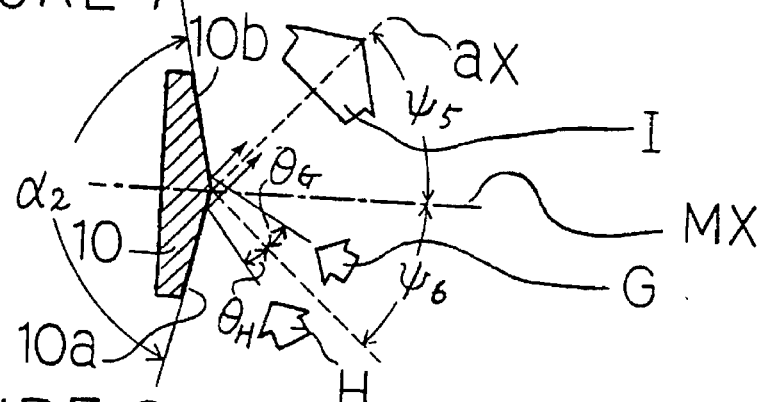
FIG. 7 is a diagram showing a light path in the vicinity of a convex cone-like reflector.

FIG. 7 is an enlarged cross-sectional view of the convex cone-like reflector wherein a light path in and around the reflector is shown. The convex cone-like reflector 10 is a quadrangle cone or a circular cone or an elliptic circular cone wherein the shape in cross section of a plane sectioned to include the symmetric axis of the reflector is substantially triangle. The conical surface of the reflector functions as a reflection surface.

As shown in FIG. 20, light emitting and propagating from the elliptic mirror 12 enters at an inclination angle $\Psi$ with respect to the symmetrical axis of the convex cone-like reflector 10. In FIG. 7, $\Psi=\Psi_5=\Psi_6$. Then, the light reflected by the reflection surface 10a or 10b propagates in the direction of the optical axis which is inclined by an angle $\Psi$ with respect to the symmetrical axis of the reflector.

Concerning the angle of the apex of the reflector, there is the optimum value which can be determined depending on the distribution of light emitted from the light source 11, the shape of the elliptic mirror 12, the display size of the display element 15, the effective F number of the projection optical system and so on. The top of the apex angle $\alpha_2$ is located substantially on the optical axis, and the symmetrical axis, i.e. the bisector line of the apex angle of the convex cone-like reflector 10 is inclined to the optical axis. The angle of inclination $\Psi$ is in a range of 20°–50°.

Any material can be used for the cone-like reflector as long as the material can provide an optical regular reflection plane. When a metallic reflecting layer or a reflection layer comprising multi-layered dielectric substance is formed on a surface of a cone-prism having an optical plane, a reflection type prism can be provided.

It is preferable to form a multi-layered light interference dielectric film or a cold mirror on an optical glass prism optically polished wherein light having a specified wavelength range is reflected and needless light is transmitted or absorbed, for instance, visible light is reflected and heat rays are transmitted.

Figure 8:
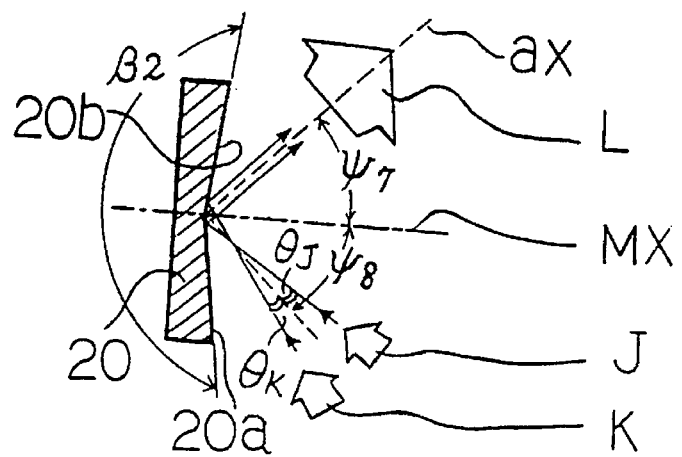
FIG. 8 is a diagram showing a light path in the vicinity of a concave cone-like reflector.

FIG. 8 is a enlarged cross-sectional view of the concave cone-like reflector wherein a light path in and around the reflector is shown. Apex angle $\beta_2$ of the conical portion of the concave cone-like reflector 20 is formed of a concave surface wherein the apex angle $\beta_2$ is in a range of 183°–210°. The concave surface of the reflector 20 is mainly of circular cone or a pyramidal cone. The top of the apex angle $\beta_2$ is located substantially on the optical axis, and the bisector line of the apex angle is inclined with respect to the optical axis. Specifically, the inclination angle $\Psi$ (where $\Psi=\Psi_7=\Psi_8$) is in a range of 20°–50°.

Although the conical portion of the reflector is a circular cone or pyramidal cone in this Example, the shape sectioned by a plane perpendicular to the bisector line of the apex angle of the conical portion of the reflector is not always circular or square, but it may be of an elliptic shape or a rectangular shape. In this case, the value of the apex angle of the conical portion is not single, but it assumes a plurality of values or a distributed value. Further, cross-sectional lines 10a, 10b, 20a, 20b of the conical surface of the cone-like reflector may be curved lines other than linear lines.

A cooling device is preferably provided in rear of the reflector. Further, it is preferable to achieve a high reflectance (about 99%).

In particular, it is preferable to arrange the cone-like reflector so that light from a portion other than the effective reflection surface of the cone-like reflector is transmitted backwardly so as not to reach the condenser lens, or it is preferable to locate an aperture stop of black color so that the light is interrupted.

The effective surface area portion of the reflection surface of the convex cone-like reflector 10 or the concave cone-like reflector 20 may be determined in consideration of the size of the light source, a desired brightness and the contrast ratio and so on. Generally, when parallel light fluxes are to be formed as shown in FIG. 20, the ratio of the average diameter $D_1$ of the opening portion of the first aperture 17 or the diameter of the effective surface area of the convex cone-like reflector 10 or the concave cone-like reflector 20 to restrict the amount of the light fluxes at the second focal point to the focal length $f_1$ of the condenser lens 13 is preferably determined to be $D_1/f_1=0.04–0.21$.

Figure 13:
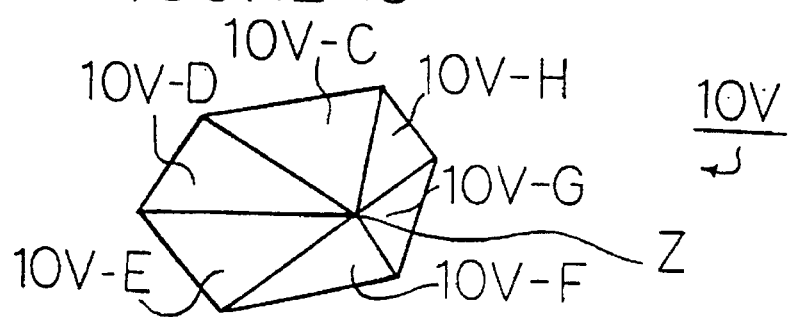
FIG. 13 is a perspective view of a convex cone-like material of polygonal surfaces.

The cone-like material may have a shape of polygonal cone 10V as shown in FIG. 13. Further, the polygonal cone may be such that the side surfaces (10V–C through 10V–H) can be mechanically bended so that the number of side surfaces of the polygonal cone can be increased or decreased. With such structure, it is possible to determine the optimum condition depending on the aspect ratio of a picture formed by a picture image signal system.

The other constituent parts of this Example are the same as those of the transparent type cone prism. For instance, when the second condenser lens 16 (focal length $f_2$) and the second aperture 18 (having an average diameter $D_2$ of opening portion) are used as shown in FIG. 20, the ratio $D_2/f_2$ is preferably a value equal to or larger than the before-mentioned ratio $D_1/f_1$.

EXAMPLE 5

FIG. 1 shows a projection type display apparatus 301 according to the present invention in which a light source apparatus 101 provided with a convex cone-like prism 1 is used. A color separating and synthesizing optical system (comprising dichroic mirrors DM1, DM2, DM3, DM4 and reflection mirrors M1 and M2) is so positioned that the normal line of the optical surface is in an angle range of 15°–40°, preferably, 15°–35° with respect to the optical axis.

Specifically, the angle of the color separating and synthesizing optical system is 30° so as to provide a diamond like light path, whereby the wavelength separating characteristic of the dichroic mirrors can be improved by the incident angle or the emission angle, whereby a loss of light can be reduced, and light modulation with good chromaticity and a full-color projection display become possible.

Strong parallel light fluxes L-COH having good collimation which have been emitted from the light source apparatus 101 are introduced into display elements 15R, 15G, 15B each of which is provided with a liquid crystal solidified matrix composite, has a transparent-scattering type operation mode and are provided for each color R, G and B. Thereafter, they are projected on a screen (not shown) through a projection optical system.

The projection type display apparatus 301 can project strong light fluxes as its major function, and is capable of determining the optimum condition of projection image depending on a circumstance of brightness by adjusting two aperture stops. For instance, the opening size of apertures is increased in a bright room to increase the brightness of a picture to thereby render the contrast ratio to be about 30:1. In this case, the display apparatus can be used as a large surface/high resolution data terminal picture image display apparatus without darkening illumination in a bright conference room or the like.

On the other hand, in a dark room, the opening size of apertures is decreased to adjust the brightness of picture to be intermediate and remove scattering light more effectively so that the contrast ratio is about 150:1. In this case, the display apparatus can be used in a mini-theater. It is possible to obtain the optimum display condition by monitoring the illuminance in the circumstance by using a photosensor, and by changing the opening size of pair of aperture stops depending on the detected illuminance.

In this Example, the well-collimated light fluxes are used. Accordingly, when the projection type display apparatus 301 is used in combination With a rear type projection screen with a lenticular lens having a black stripe, a picture image can be obtained, without causing a black level deterioration even under the condition of an outer light, by increasing relatively the surface area portion of the black stripe to thereby reduce the factor of opening portion. In this case, a sufficient brightness and contrast ratio can be obtained without reducing an effective factor of opening portion.

EXAMPLE 6

Figure 2A:
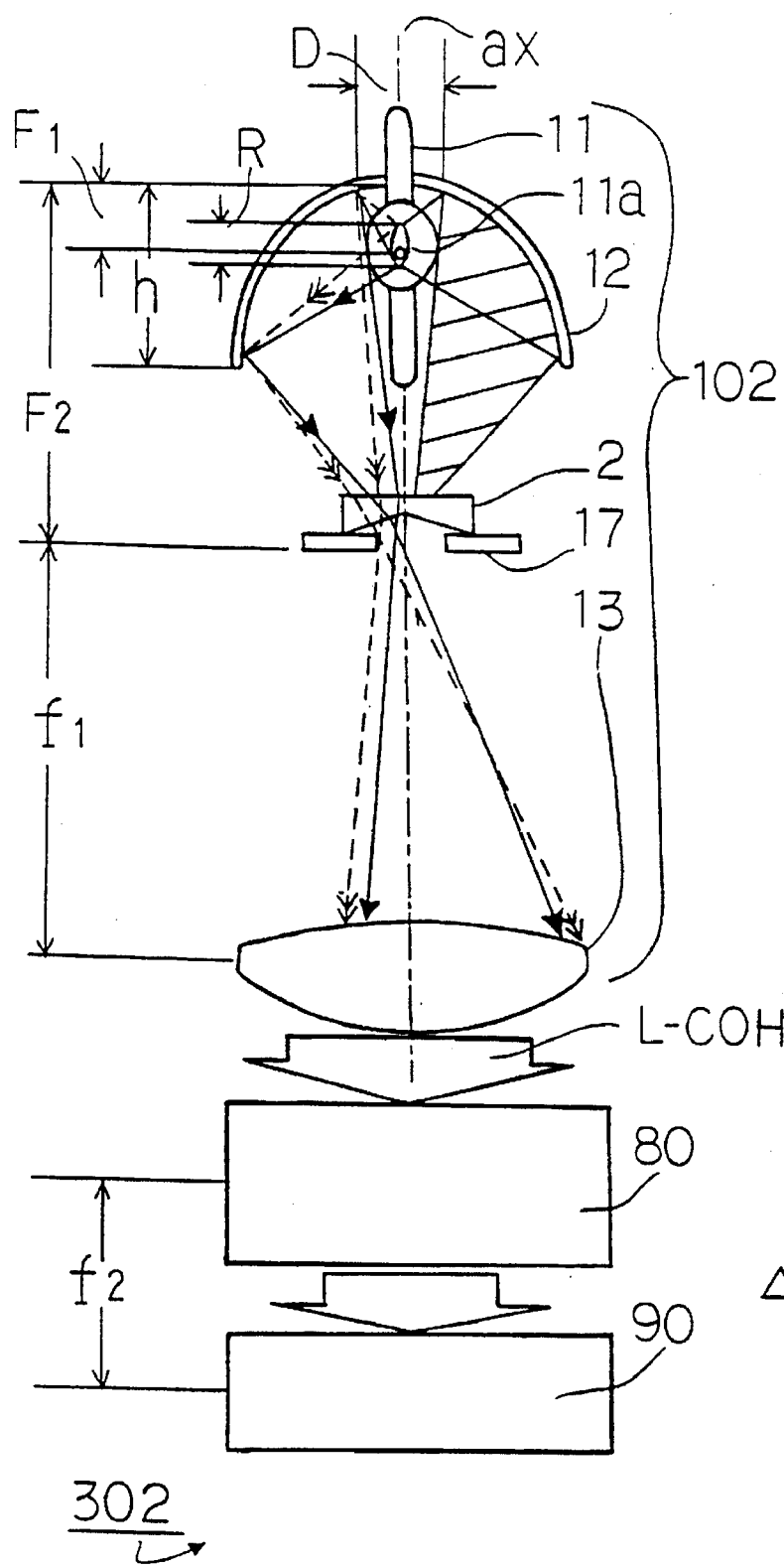
FIG. 2a is a block diagram showing the construction of the projection type display apparatus 302 of the present invention.

FIG. 2(a) shows a projection type display apparatus 302 according to the present invention in which a light source apparatus 102 provided with a concave cone prism 2 is used. In FIG. 2(a), the same reference numerals designate the same structural elements as those of Examples 1 through 5.

A character R designates the length of the light emission part of the light source portion 11a of the light source 11. The positional relationship between the center of the arc emission part and the first focal point $F_1$ of the elliptic mirror 12 is determined by the light distribution of the light emission part. The color separating and synthesizing optical system and the display element are indicated as a whole as a block 80 and the projection light system is indicated as a block 90. The focal length of the second light converging means is indicated by $f_2$.

In this Example, strong parallel light fluxes L-COH having well collimation emitted from the light source apparatus 102 are introduced to the display element, and finally, they are projected on a screen (not shown) through the projection optical system 90.

Figure 2B:
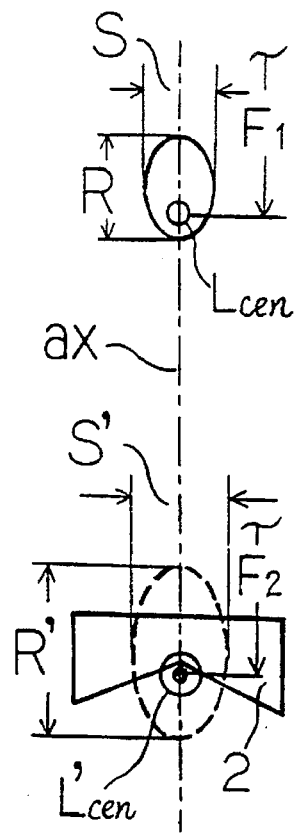
FIG. 2b is a diagram showing a light emission part and its image.
Figure 2C:
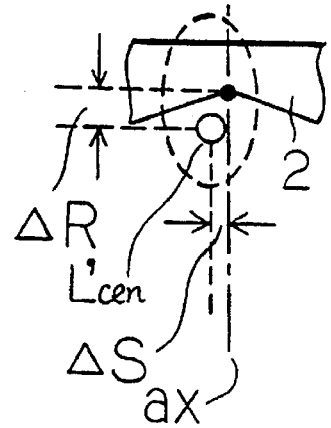
FIG. 2c is an enlarged diagram showing a deviation of the image.

FIG. 2(b) shows enlarged block diagram of the light emission part and its image formation near the second focal point.

EXAMPLE 7

Figure 3:
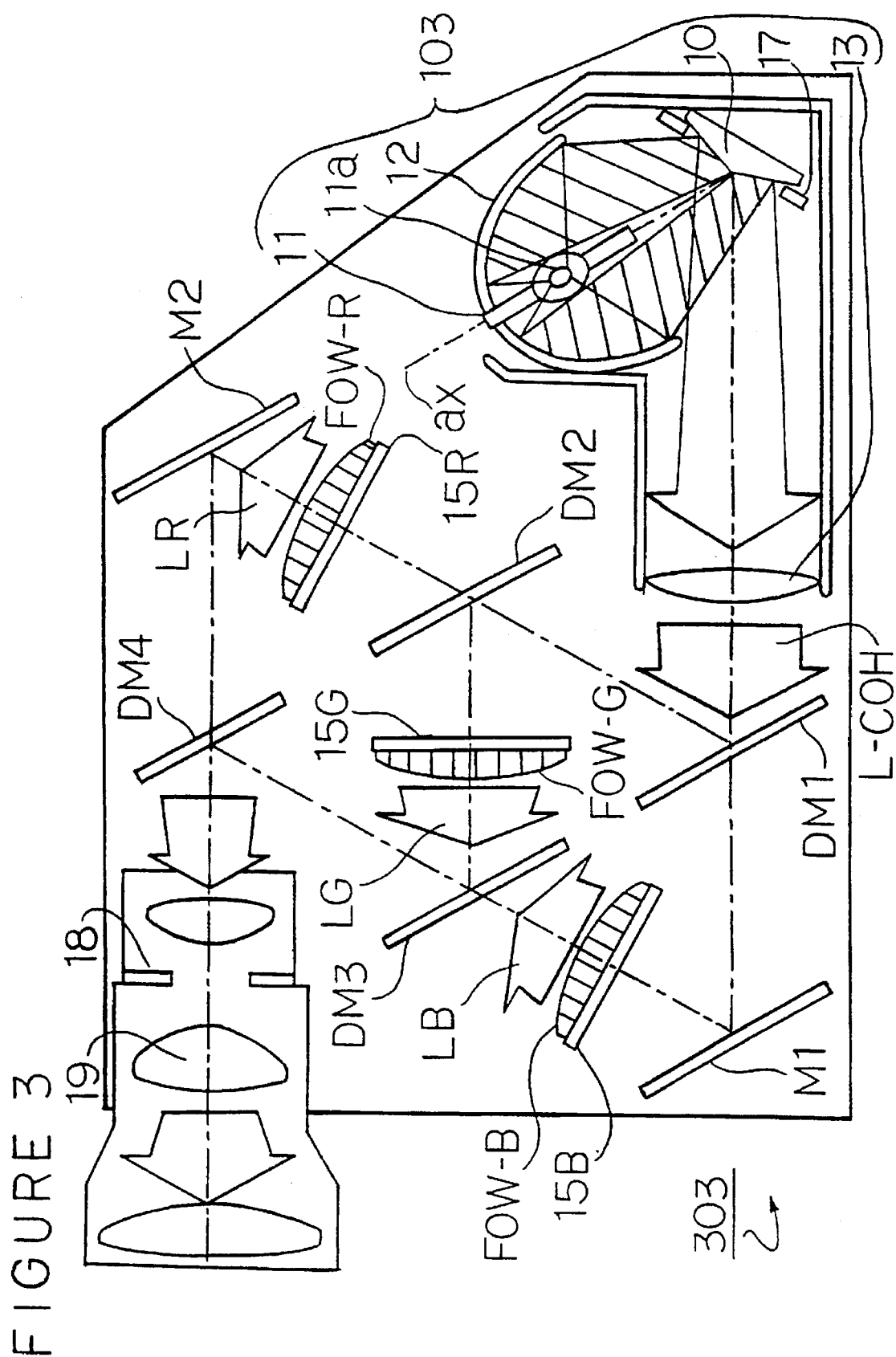
FIG. 3 is a block diagram showing the construction of the projection type display apparatus 303 of the present invention.

FIG. 3 shows a projection type display apparatus 303 according to the present invention in which a light source apparatus 103 provided with the convex cone-like reflector 10 is used. A color separating and synthesizing optical system (dichroic mirrors DM1, DM2, DM3, DM4 and reflection mirrors M1, M2) has the same angular relation as that of Example 5 with respect to the optical axis. Specifically, the optical system is arranged at an angle of 30°.

Strong collimated light fluxes L-COH having good directivity emitted from the light source apparatus 103 are introduced to display elements 15R, 15G, 15B each including a liquid crystal and solidified matrix composite, having a transparent-scattering type operation mode and provided for three colors R, G, B; the light fluxes transmitted through the display elements 15R, 15G, 15B are introduced respectively to fiber optics windows for each color of R, G and B, which are used as means for converging the light fluxes without deteriorating the collimation of the light fluxes, instead of a simple lens, and finally, the light fluxes are projected on a screen (not shown) through the projection optical system.

The fiber optics window is a glass element formed by slicing and grinding a bundle of melt-bonded optical fibers each having a diameter of about 20 μm in which glass having a relatively large refractive index is used as a core and glass having a relatively small refractive index is used as a clad. The fiber optics window used in this Example has such a structure that EMA as a light absorbing material is formed around the clad of the optical fibers. The fiber optics window is processed to have a shape of plano-convex lens so as to function as the second light converging means. With the structure described above, incident light other than NA which is defined by a refractive index value between the core and the clad is absorbed and is not emitted. Accordingly, a component of scattering light from the display element 15 is absorbed in the fiber optics window to thereby reduce needless light; reducing the black level in a projected picture image and providing a high contrast ratio.

When an active element is used for the display element and further, an optical element such as a microlens array or the like is provided in correspondence to the pixels of it, the effect of the directivity and the parallelism of light of the optical source apparatus can be further improved.

Further use of the cone-like reflector makes the volume of the entire apparatus more compact than the transparent type apparatus by suitably arranging the structural elements.

EXAMPLE 8

Figure 4:
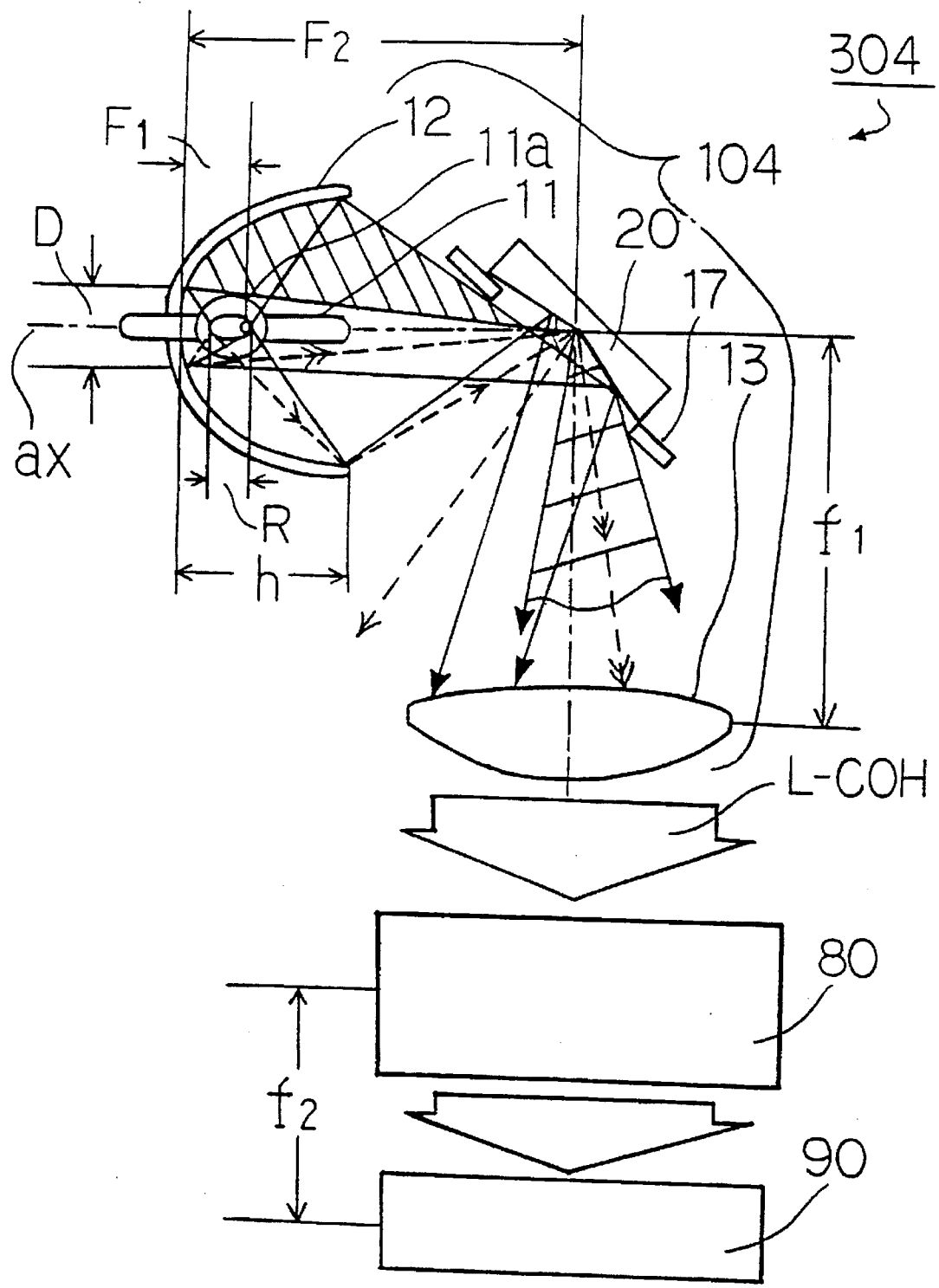
FIG. 4 is a block diagram showing the construction of the projection type display apparatus 304 of the present invention.

FIG. 4 shows a projection type display apparatus 304 according to the present invention in which a light source apparatus 104 provided with the concave cone-like reflector 20 is used. A color separating and synthesizing optical system and a display element are indicated as a block 80 and a projection type system is indicated as a block 90. The focal length of the second light converging means is indicated as $f_2$. In this Example, strong collimated light fluxes L-COH having good directivity emitted from the light source apparatus 104 are introduced to the display element, and finally, the light fluxes are projected on a screen (not shown) through the projection optical system 90. In FIG. 4, the apex of the concave cone-like reflector 20 is shown to be at the second focal point of the elliptic mirror 12. However, the position of the apex of the concave cone-like reflector 20 is not always to be at the point, but it is enough to obtain a preferred distribution of the orientation of emission light at a location near the second focal point.

EXAMPLE 9

Figure 22:
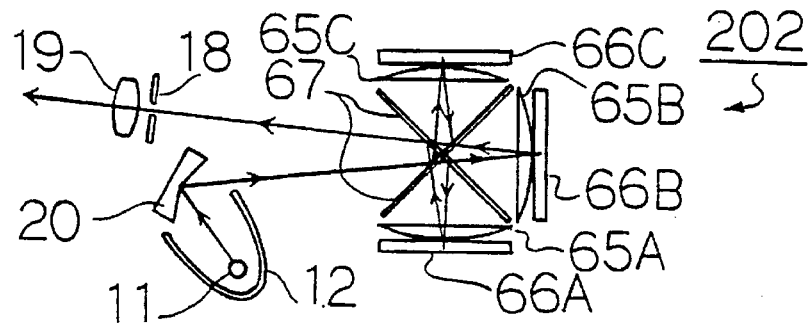
FIG. 22 is a block diagram of the apparatus according to Example 9.
Figure 23:
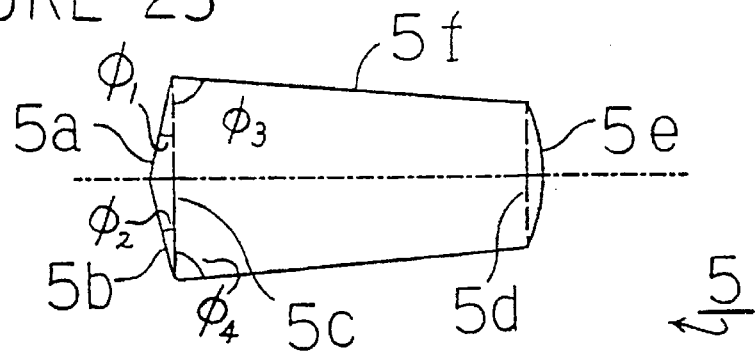
FIG. 23 is a cross-sectional view of a long rod-like prism used for a conventional apparatus 150B.
Figure 24:
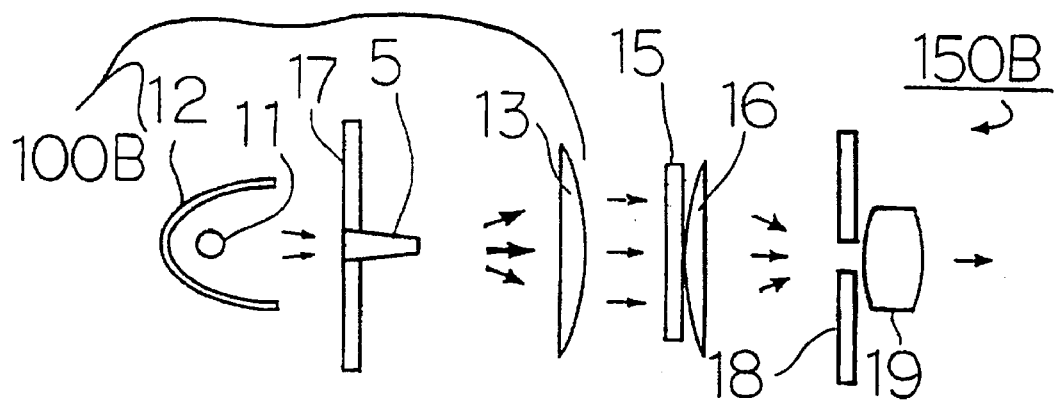
FIG. 24 is a block diagram of the conventional apparatus 150B.
Figure 25:
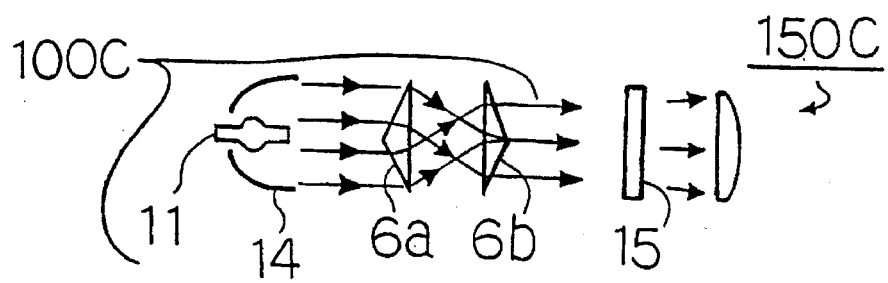
FIG. 25 is a block diagram of the conventional apparatus 150C.
Figure 26:
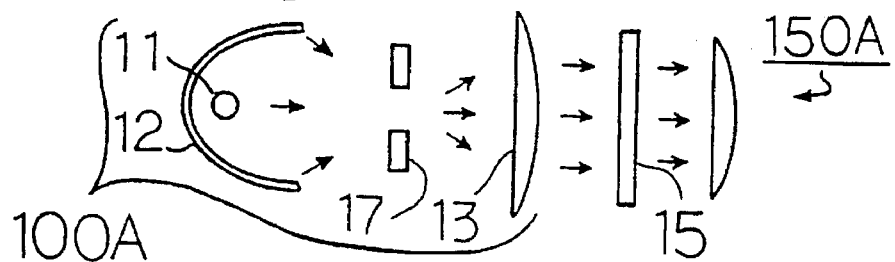
FIG. 26 is a block diagram of the conventional apparatus 150A.

As Example 9, an example of the construction of a projection type display apparatus in which a light source apparatus 104, a color separating and synthesizing optical system and three transparent and scattering type liquid crystal display elements of reflection type are used, is shown in FIG. 22. In this Example, since strong collimated light fluxes were passed several times through the liquid crystal and solidified matrix composite, the transparent and scattering characteristics of the display element could be modulated and controlled with high efficiency, and a bright projection picture image having a high contrast ratio could be obtained.

In this Example, orthogonally intersecting type dichroic mirrors are used to separate the color of the light into three colors R, G and B. For each color, display elements 66A–66C and condenser lenses 65A–65C each of which functions as the above-mentioned light converging means 13, and the second light converging means (condenser lens 16) are used. The apparatus of this Example can be used not only for projecting a display, but also for an analog control of light having a strong light flux.

The apparatuses described in the Examples of the present invention are shown with comparison in Tables 6 through 11. In Tables, R represents the length of the light emission part of the light source, $F_1$ represents the first focal length of the elliptic mirror, $F_2$ represents the second focal length, h represents the depth of the elliptic mirror, TR represents the cone-like material of a transparent type, and RF represents the cone-like material of a reflection type.

In order to show the size of the display element a unit of inch is used for the length of the diagonal line of the rectangular display portion. Further, in order to show the arrangement of the second light converging means (condenser lens 16), the light incident side of the display element is represented as F and the light emission side is represented as B. Remarks are described hereinbelow.

Remark 1) Collimation implies that the cone angle (divergence total angle) of light emitted from the optical source apparatus having directivity in all directions is 90% or more.

Remark 2) Uniformity implies that a value (%) determined by (Imax−Imin)/(Imax+Imin)×100 where Imax is the maximum value of illuminance in a illuminating plane and Imin is the minimum value.

Remark 3) The transmittance of the projection lens is 85%.

Remark 4) In determination of chromaticity, ⊚ represents a degree determined in an NTSC standard and ○ represents a degree obtained by a direct view type CRT.

TABLE 6

| Kind of light source apparatus of the present invention | Structural elements | | | | | | | Characteristics | | | | |
|---|---|---|---|---|---|---|---|---|---|---|---|---|
| | R mm | $F_1$ mm | $F_2$ mm | h mm | f mm | type | Apex angle ° | Length of diagonal line inches | Collimation ° | Projected luminous flux 1 m | Uniformity | Evaluation |
| 101 | 5 | 22 | 105 | 50 | 168 | TR | 114 | 3.4 | 6 | 2640 | ◉ | ◉ |
| | | | | | | | | | 10 | 5500 | | |
| 102 | 5 | 20 | 120 | 50 | 160 | TR | 220 | 5 | 6 | 4200 | ◉ | ◉ |
| | | | | | | | | | 10 | 7400 | | |
| 103 | 3 | 13 | 87 | 41 | 160 | RF | 160 | 2 | 6 | 2400 | ◉ | ◉ |
| | | | | | | | | | 10 | 5000 | | |
| 104 | 5 | 20 | 140 | 60 | 400 | RF | 204 | 10 | 6 | 7800 | ◉ | ◉ |
| | | | | | | | | | 10 | 7800 | | |

TABLE 7

| Kind of conventional light source apparatus | Structural elements | | | | | | | Characteristics | | | | |
|---|---|---|---|---|---|---|---|---|---|---|---|---|
| | R mm | $F_1$ mm | $F_2$ mm | h mm | f mm | type | Apex angle ° | Length of diagonal line Inches | Collimation ° | Projected luminous flux 1 m | Uniformity | Evaluation |
| 100A | 5 | 22 | 105 | 50 | 168 | Absence | | 3.4 | 6 | 1700 | Δ | Δ |
| | | | | | | | | | 10 | 3800 | | |
| 100B | 5 | 15 | 200 | 80 | 120 | Rod prism | | 5 | 6 | 3000 | ○ | ○ |
| 100C | 5 | 15 | ∞ | 25 | Absence | Parabolic mirror | TR ×2 | 70 | 3.4 | 15 | 2700 | ○ | Δ |
| 100D | 5 | | Absence | | 60 | TR ×2 | 70 | 5 | 10 | 1200 | ◉ | Δ |

TABLE 8

| Kind of projection type display apparatus Type | Light source apparatus | | | Display element | | | | Optical system | | |
|---|---|---|---|---|---|---|---|---|---|---|
| | | Cone-like material | | Length of diagonal line inches | Number of pixel V × H | TFT arrays Aperture ratio % | Ton Vin = 6V % | RGB filter/optical efficiency % | Dichroic mirror | Lens arrangement |
| | Kind | Type | Apex angle ° | | | | | | | |
| 151 | 102 | TR | 140 | 5 | 480 × 640 × 3 Single plate | 40 | 28 | Mozaic/25 | Absence | B |
| 152 | 104 | RF | 156 | 10 | 480 × 640 × 3 Single plate | 50 | 35 | Mozaic/29 | Absence | B |
| 201 | 101 | TR | 114 | 3.4 | 480 × 640 Three plates | 53 | 37 | Absence/55 | 45° incidence | F |
| 202 | 103 | RF | 200 | 2 | 480 × 640 Three plates | 80 | 56 | Absence/65 | 45° incidence | B |
| 150A | 100A | Absence | | 5 | 480 × 640 × 3 Single plate | 40 | 28 | Absence/55 | 45° incidence | B |
| 150B | 100B | Rod prism | | 5 | 480 × 640 × 3 Single plate | 40 | 28 | Mozaic/65 | 45° incidence | B |

TABLE 9

| Kind of projection type display apparatus type | Collimation Type | ° | Projected luminous flux 1 m | Contrast ratio | Uniform-ity | Chromat-icity | Evalua-tion |
|---|---|---|---|---|---|---|---|
| 151 | Variable | 6 | 270 | 140 | ◉ | ○ | ○ |
|  |  | 10 | 480 | 50 |  |  |  |
| 152 | Variable | 4 | 520 | 200 | ◉ | ○ | ○ |
|  |  | 7 | 700 | 100 |  |  |  |
| 201 | Variable | 6 | 460 | 140 | ◉ | ◉ | ◉ |
|  |  | 10 | 960 | 50 |  |  |  |
| 202 | Variable | 6 | 650 | 220 | ○ | ○ | ◉ |
|  |  | 10 | 1300 | 80 |  |  |  |
| 150A | Variable | 6 | 160 | 140 | Δ | ○ | Δ |
|  |  | 10 | 280 | 50 |  |  |  |
| 150B | Fixed | 6 | 200 | 140 | ○ | ○ | Δ – (○) |

TABLE 10

| Kind of projection type display apparatus Type | Light source apparatus | | | Display element | | | | Optical system | | |
|---|---|---|---|---|---|---|---|---|---|---|
| | | Cone-like material | | Length of diagonal line inches | | TFT arrays | | | | |
| | Kind | Type | Apex angle ° | | Number of pixel V × H | Aperture ratio % | Ton Vin = 6V % | RGB filter/optical efficiency % | Dichroic mirror | Lens arrange-ment |
| 301 | 101 | TR | 114 | 3.4 | 480 × 640 Three plates | 53 | 37 | Absence/70 | 30° incidence | B |
| 302 | 102 | TR | 220 | 5 | 1000 × 1400 Three plates | 40 | 28 | Absence/70 | 30° incidence | F |
| 303 | 103 | RF | 160 | 3.4 | 480 × 640 Three plates | 53 | 37 | Absence/70 | 30° incidence | B+ FOW |
| 304 | 104 | RF | 204 | 10 | 480 × 640 Single plate | 53 | 37 | Presence/29 | Absence | F |
| 300 | 100C |  | Absence | 3.4 | 480 × 640 Three plates | 53 | 37 | /55 | 45° incidence Dichroic | F |

TABLE 11

| Kind of projection type display apparatus type | Collimation Type | ° | Projected luminous flux 1 m | Contrast ratio | Uniform-ity | Chromat-icity | Evalua-tion |
|---|---|---|---|---|---|---|---|
| 301 | Variable | 6 | 650 | 140 | ◉ | ◉ | ◉ |
|  |  | 10 | 1350 | 50 |  |  |  |
| 302 | Variable | 4 | 700 | 130 | ◉ | ◉ | ◉ |
|  |  | 7 | 1230 | 46 |  |  |  |
| 303 | Variable | 6 | 650 | 160 | ◉ | ◉ | ◉ |
|  |  | 10 | 1350 | 90 |  |  |  |
| 304 | Variable | 6 | 540 | 140 | ◉ | ○ | ◉ |
|  |  | 10 | 560 | 50 |  |  |  |
| 300 | Fixed | 15 | 460 | 23 | ○ | ◉ | Δ |

In the following, description will be made as to an example which is featurized by the arrangement of the liquid crystal optical element and the color separating and synthesizing optical system.

Figure 27:
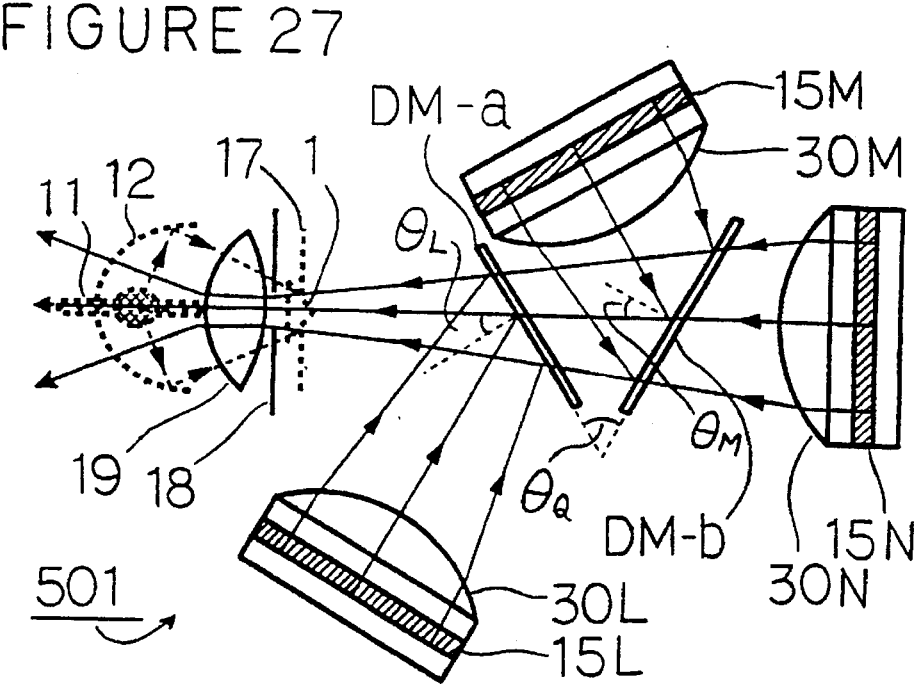
FIG. 27 is a plane view showing the third reflection type optical apparatus 501.
Figure 28:
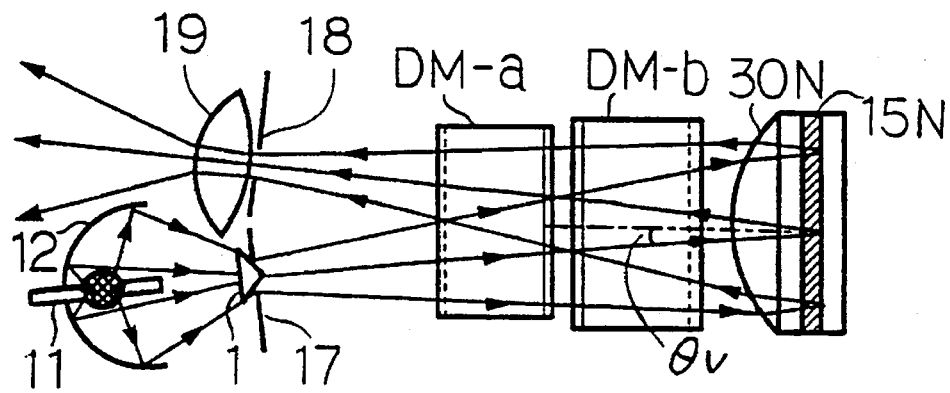
FIG. 28 is a side view of the third reflection type optical apparatus 501.

FIG. 27 is a plane view and FIG. 28 is a side view of the Example respectively. This Example provides a color projection type reflection optical apparatus of a small size, a light weight and a high chromaticity.

EXAMPLE 10

This Example is to provide a third reflection type optical apparatus 501 of the present invention. Namely, in the projection type color liquid crystal optical apparatus comprising a light source system for projecting light, color separating and synthesizing dichroic mirrors; three reflection-type liquid crystal optical elements; condenser lenses; and a projection lens, wherein the color separating and synthesizing dichroic mirrors consist of a first flat plate type dichroic mirror and a second flat plate type dichroic mirror; the angle $\theta_L$ formed between the optical axis and the normal line of the surface of the first flat plate type dichroic mirror is in a range of 20°–35°; the angle $\theta_M$ formed between the optical axis and the normal line of the surface of the second flat plate type dichroic mirror is in a range of 20°–35°; the first and second flat plate type dichroic mirrors are arranged to have an angle $\theta_Q$ of 40°–70° in a horizontal plane; the three reflection type liquid crystal optical elements have respectively function to electrically control transparent and scattering states, and are provided with a reflection surface; the three reflection type liquid crystal optical elements are respectively arranged to have an angle $\theta_\nu$ of 2°–10° between the normal line of the reflection surface and the optical axis; the plane defined by the optical axis of an incident light and the optical axis of a reflection light is arranged so as to intersect substantially orthogonally to the plane which is in parallel to the plane including the normal line of the first flat plate type dichroic mirror and which is in parallel to the plane including the normal line of the second flat plate type dichroic mirror; light emitted from the light source system is color-separated into three color lights by the-function of the first flat plate type dichroic lights and/or the second flat plate type dichroic mirror, and the three color lights are emitted from either one of the first and second flat plate type dichroic mirrors, each of the three color lights is passed through each condenser lens to form substantially parallel light beams; each of parallel light beams of the three color lights is introduced into the reflection type liquid crystal optical element corresponding to each of the color lights and reflected by the reflection surface, each of the reflected three color lights is converged by the condenser lens; the three color lights are color-synthesized to be projection light by the function of the first and/or the second flat plate type dichroic mirrors; and, the color-synthesized light is projected through the projection lens.

In this embodiment, the three liquid crystal optical elements are arranged so as to face in a Δ (delta) form in a horizontal plane and the optical axis is shifted by the angle $\theta_\nu$ in a plane including the normal line between the light path before reflection and the light path after reflection. Namely, a feature of third reflection type optical apparatus is to effect looking up or looking down projection.

The optical apparatus of this example will be described with reference to FIG. 27. The first flat plate type dichroic mirror is indicated by DM-a and the second flat type dichroic-mirror is indicated by DM-b. The reflection type liquid crystal optical elements provided with a reflection surface are indicated by 15L, 15M and 15N respectively. The optical converging means 30L, 30M and 30N are provided in close contact with the front surface of the reflection type liquid crystal optical elements.

In this example, it is not always necessary that the angles $\theta_L$ and $\theta_M$ for the two dichroic mirrors are completely matched. However, they are preferably set at 30° respectively. In the description, the angle formed in a horizontal plane implys an angle formed by the reflection surfaces of the two flat plate type dichroic mirrors. For instance, there is shown the angle $\theta_Q$ in the plane view of FIG. 27. Preferably, $\theta_Q$ is set to be 60°.

The same light source apparatuses described in the before-mentioned Examples can be used. For instance, the light source apparatus including the elliptic mirror and the cone-like material, both being mentioned before, is used as shown in FIG. 27 and FIG. 28. In this Example, however, three light converging means are provided behind the color separating and synthesizing optical system. Further, light is passed at least twice through the liquid crystal and solidified matrix composite layer and the optical converging means.

In the third reflection type optical apparatus, the light reflection means may be disposed in the liquid crystal optical element, or may be disposed in contact with a transparent type liquid crystal optical element, or may be separated spatially. Further, the light reflection means may have a light converging function to focus light in addition to the light reflecting function. An example of the construction of the liquid crystal optical element including the reflection surface will be described.

Figure 29:
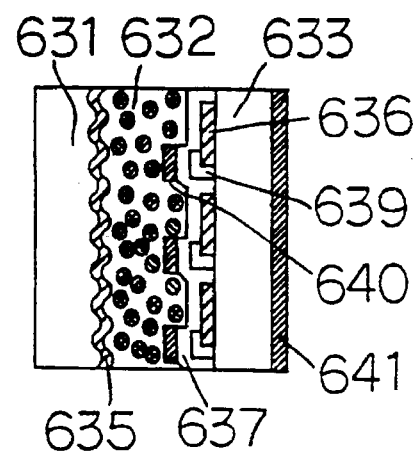
FIG. 29 is a cross-sectional view showing an embodiment of a reflection type liquid crystal optical element in which a reflection layer is formed between an active element and a light blocking layer.

FIG. 29 is a cross-sectional view of such construction. Three back electrode substrates 633 were prepared for R, G and B colors, each comprising a glass substrate on which a TFT 639 and a transparent electrode 636 are formed.

The back electrode substrate 633 included a reflection layer as a dielectric multi-layered film 637 which was obtained by alternately laminating 20 layers of $SiO_2$ of a refractive index of 1.45 and $TiO_2$ of a refractive index of 2.35 so that each of the optical film thickness nd is λ/4 (λ: the center wavelength in each R, G and B wavelength regions) wherein the effective reflectivity is from about 95% to more than 99.9% at maximum.

Further, a light blocking layer 640 was formed at the position corresponding to the TFT for each pixel, the light blocking layer using a black photopolymer having a high electric insulating property which was prepared by dispersing fine carbon particles in photopolymer.

On the other hand, fine concave and convex (frost) were formed on a surface of the glass substrate to the extent that regular reflection light was reduced while transmitting light was not substantially reduced. Further, a transparent electrode 635 was formed on the surface to prepare a front electrode substrate 631. A layer consisting of a liquid crystal and solidified matrix composite 632 was sealed between the back electrode substrate 633 and the front electrode substrate 631.

Figure 30:
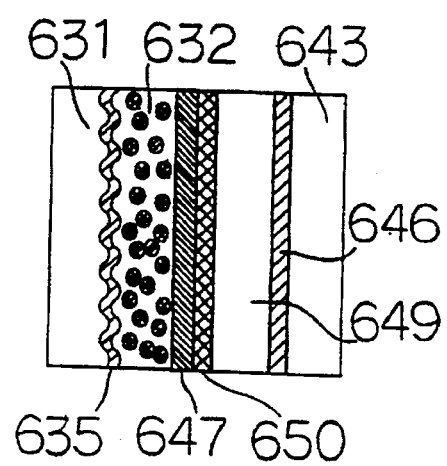
FIG. 30 is a cross-sectional view showing an embodiment of a spatial light modulation type liquid crystal optical element in which a photoconductive layer and a reflection layer are formed.

The liquid crystal optical element having a reflection surface may have an optical addressing type spatial light modulator instead of the TFT as shown in the cross-sectional view of FIG. 30. In this case, an FAP was used for the back electrode substrate 643. The liquid crystal optical element was provided with a transparent electrode 646, an amorphous-Si-photoconductive film 649 and a light blocking film 650 consisting of a CdTe film of 1 μm thick.

A back electrode substrate was prepared by using the same materials as the before-mentioned back electrode substrate wherein as the reflecting film, a dielectric multi-layered film 647 was formed by laminating 40 layers, each having an optical film thickness nd of λ/4. The liquid crystal and solidified matrix composite layer 632 was sealed between the back electrode substrate 643 and the front electrode substrate 631 in which the transparent electrode 635 was formed on the glass substrate having fine concave and convex in its one surface.

The reflection type liquid crystal optical element having another construction was prepared. Namely, an insulating material was used for the back electrode substrate; a charge transfer plate (CTP) having a structure in which a large number of thin conductive wires were densely embedded in the block electrode substrate was prepared, and the dielectric multi-layer was formed between the CTP and the liquid crystal and solidified matrix composite to form a reflecting layer. Thus, a reflection type liquid crystal optical element with CTP was prepared. The electric multi-layered film preferably possesses function of selecting and reflecting a light having a specified wavelength. Each of the dichroic mirrors is so disposed that the spectral transmittance changes at a position in the plane so as to reduce the difference of the spectral transmittance corresponding to the difference of a light incidence angle at a position in the plane of the dichroic mirror.

Further, at least one among the reflection surfaces of the three reflection type liquid crystal optical elements may have the function of selecting and reflecting light having a specified wavelength which compensates the chromaticity of the first flat plate type dichroic mirror and/or the second flat type dichroic mirror which have function of color separating and synthesizing.

Further, in the third reflection type optical apparatus, two aperture stops may be provided as an auxiliary optical means so as to cooperate with each other.

In the optically applied apparatus of the present invention, since the light source apparatus for collecting light emitted from the light source 11 with use of the elliptic mirror 12 is used, efficiency of collecting light is high and a bright display is possible.

A combination of the concave cone prism 2 or the convex prism 1 having a specified shape and the first aperture is disposed at or near the second focal point of the elliptic mirror 12 to remove scattering light, and accordingly, the light being emitted from the light source having a finite length and directed to the transparent-scattering type display element 15 without passing through the second focal point after the reflection by the elliptic mirror 12 can be removed. Accordingly, the contrast ratio of a projected picture image can be improved.

Further, use of the cone-like material can substantially improve non-uniformity in the distribution of illuminance in the surface of the display element, such non-uniformity being-derived from a shortage of a light component parallel to the optical axis at the second focal point of the elliptic mirror 12 which is caused in a case of using the light source 11 having a light shielding portion and the elliptic mirror 12. Thus, the projection display apparatus having excellent uniformity of illuminance at the central portion is obtainable while the luminous flux of a projected picture image is increased. The projection display apparatus can provide brightness and a high contrast ratio.

The light source apparatus of the present invention can be used as a light source for overhead projection. Further, it can be used as an illuminating apparatus of high performance.

In the present invention, since the distribution of orientation of light entering into the condenser lens 13 can be adjusted depending on the apex angle of the cone-like material, light can be collected effectively to the surface of the display element even when the shape of the display element 15 is other than square. According to the present invention, various applications are possible as far as the effect of the present invention is not reduced. For instance, a shutter array for an optical printer can be formed by using a linear light source and a long-shaped reflection mirror wherein the shape of a plane sectioned in parallel to the direction of the emission of light is elliptic, and further, in combination with a cone prism which is elongated in one direction and has a concave and convex surfaces, and a transparent and scattering type display element. In this case, a printed image having a high contrast ratio can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A light source apparatus which comprises:

an ellipsoidal mirror;

a light source disposed in a vicinity of a first focal point of the ellipsoidal mirror;

a cone-shaped element, disposed in a vicinity of a second focal point of the ellipsoidal mirror so that an apex of the cone-shaped element is substantially on an optical axis of the cone-shaped element; and an optical converging means, wherein light emitted from the light source is reflected and converged by the ellipsoidal mirror to be incident on the cone-shaped element, light is emitted through a conical surface of the cone-shaped element and enters as divergent light into the optical converging means by which the light is regulated to be substantially parallel light fluxes;

wherein said cone-shaped element is a convex cone prism having an apex angle $\alpha_1$ of 90°–175° in a plane sectioned to include an optical axis of the prism, and a flattened incident surface of the prism.

2. The light source apparatus according to claim 1, wherein apex angles, which are formed when said cone-shaped element is sectioned by at least two planes passing through an axially symmetrical axis passing through a center point of a plane defined by the base of the cone-shaped element, are different in a cross-sectional view sectioned by said planes.

3. The light source apparatus according to claim 1, wherein said cone-shaped element has an elliptic shape or a rectangular shape in a cross-sectional view sectioned by a plane which is perpendicular to an axially symmetrical axis passing through a center point of an ellipse or rectangle defined by the base of the cone-shaped element.

4. The light source apparatus according to claim 1, wherein a first aperture device is disposed in front or rear of the cone-shaped element.

5. A light source apparatus which comprises:

an ellipsoidal mirror;

a light source disposed in a vicinity of a first focal point of the ellipsoidal mirror;

a cone-shaped element disposed in a vicinity of a second focal point of the ellipsoidal mirror so that an apex of the cone-shaped element is substantially on an optical axis of the cone-shaped element; and an optical converging means, wherein light emitted from the light source is reflected and converged by the ellipsoidal mirror to be incident on the cone-shaped element, light is emitted through a conical surface of the cone-shaped element and enters as divergent light into the optical converging means by which the light is regulated to be substantially parallel light fluxes;

wherein apex angles, which are formed when said cone-shaped element is sectioned by at least two planes passing through an axially symmetrical axis passing through a center point of a plane defined by the base of the cone-shaped element, are different in a cross-sectional view sectioned by said planes.

6. The light source apparatus according to claims 1 or 5, wherein a length of light emission part R of said light source, a first focal length $F_1$, and a second focal length $F_2$ of said mirror, satisfy the following relationships:

$1 \text{ mm} \leq R \leq 7 \text{ mm}$, $1.5R \leq F_1$, and $3 \leq F_2/F_1 \leq 8$.

7. A projection display apparatus which comprises:
  a light source apparatus comprising,
    an ellipsoidal mirror,
    a light source disposed in a vicinity of a first focal point of the ellipsoidal mirror,
    a cone-shaped element disposed in a vicinity of a second focal point of the ellipsoidal mirror so that an apex of the cone-shaped element is substantially on an optical axis of the cone-shaped element, and
    an optical converging means, wherein light emitted from the light source is reflected and converged by the ellipsoidal mirror to enter into the cone-shaped element, light is emitted through a conical surface of the cone-shaped element and enters as divergent light into the optical converging means by which the light is regulated to be substantially parallel light fluxes;
  a color separating optical system, for generating color-separated light, comprising,
    a color separating means having an angle of incidence of 15°–40°, the angle of incidence being formed by a normal line of an optical surface of a color separating means and an optical axis of the color separating means;
  a color synthesizing optical system comprising,
    a color synthesizing means having an angle of incidence of 15°–40°, the angle of incidence being formed by a normal line of an optical surface of the color synthesizing means and an optical axis of the color synthesizing means;
  display elements disposed in light paths of color-separated light extending between the color separating optical system and the color synthesizing optical system; and
  a projection optical system.

8. The projection display apparatus according to claim 7, wherein
  dichroic mirrors are used as the color separating means of the color separating optical system and the color synthesizing means of the color synthesizing optical system;
  the display elements exhibit a transparent and scattering mode of operation and are disposed in the light paths for each of color-separated light; and
  a light converging device is disposed in front or rear of the display elements in the light paths.

9. The projection display apparatus according to claim 7, wherein said cone-shaped element is a convex cone prism.

10. The projection type display apparatus according to claim 7, wherein said cone-shaped element is a concave cone prism (2).

11. The projection type display apparatus according to claim 7, wherein said cone-shaped element is a convex cone-like reflector (10).

12. The projection type display apparatus according to claim 7, wherein said cone-shaped element is a concave cone-like reflector (20).

13. The projection display apparatus according to claim 8, wherein an aperture device having an opening portion is disposed substantially at a focal point of the light converging device.

14. The projection display apparatus according to claim 7 or 8, wherein the display elements comprise:
  a liquid crystal and solidified matrix composite in which a nematic liquid crystal having a positive dielectric anisotropy is dispersed and held in a solidified matrix between a pair of substrates, each substrate including an electrode, whereby the display elements exhibit a transparent and scattering mode of operation; and
  wherein a refractive index of the solidified matrix is in coincidence with that of the liquid crystal during an application or non-application of a voltage across the electrodes of said pair of substrates.

15. A projection display apparatus which comprises:
  a light source apparatus comprising,
    an ellipsoidal mirror,
    a light source disposed in a vicinity of a first focal point of the ellipsoidal mirror,
    a cone-shaped element disposed in a vicinity of a second focal point of the ellipsoidal mirror so that an apex of the cone-shaped element is substantially on an optical axis of the cone-shaped element, and
    an optical converging means, wherein light emitted from the light source is reflected and converged by the ellipsoidal mirror to be incident on the cone-shaped element, light is emitted from the cone-shaped element and enters as divergent light into the optical converging means by which the light is regulated to be substantially parallel light fluxes;
  a display device; and
  a projection optical system;
  wherein said cone-shaped element is a convex cone prism having an apex angle $\alpha_1$ of 90°–175° in a plane sectioned to include an optical axis of the prism, and a flattened incident surface of the prism.

16. The projection display apparatus according to claim 15, further comprising:
  a color separating optical system, for generating color separated light, comprising,
    a color separating means;
  a color synthesizing optical system, comprising,
    a color synthesizing means; and
  wherein said display device comprises a plurality of display elements arranged so that each display element is disposed in a light path of the color separated light extending between the color separating optical system and the color synthesizing optical system.

17. The projection display apparatus according to claim 15, wherein a first aperture device is disposed in front or rear of the cone-shaped element.

18. The projection display apparatus according to claim 17, wherein a second aperture device having an opening portion is disposed substantially at a focal point of the optical converging means.

19. The projection display apparatus according to claim 18, wherein an area of an opening of at least one of the first and second aperture devices is made variable.

20. The projection display apparatus according to claim 19, wherein the area of the opening is made variable to obtain an optimum display condition by monitoring an illuminance in a circumstance.

21. The projection display apparatus according to claim 20, wherein a photosensor is used for detecting the illuminance in the circumstance.

22. The projection display apparatus according to claim 21, wherein the two apertures are similar to each other.

23. The projection display apparatus according to claim 22, wherein one of an infrared ray cut filter and an ultraviolet ray cut filter is formed on the surface in front or rear of the cone-shaped element.

24. The projection display apparatus according to claim 16, wherein the color separating means has an angle of incidence of 45°, the angle of incidence being formed by a normal line of an optical surface of the color separating means and an optical axis of the color separating means; and the color synthesizing means has an angle of incidence of 45°, the angle of incidence being formed by a normal line of an optical surface of the color synthesizing means and an optical axis of the color synthesizing means.

25. The projection display apparatus according to claim 16, wherein the color separating means has an angle of incidence of 30°, the angle of incidence being formed by a normal line of an optical surface of the color separating means and an optical axis of the color separating means; and the color synthesizing means has an angle of incidence of 30°, the angle of incidence being formed by a normal line of an optical surface of the color synthesizing means and an optical axis of the color synthesizing means.

26. The projection display apparatus, according to claim 15, wherein a layer of liquid crystal polymer composite is arranged in said display device.

27. The projection display apparatus according to claim 24, wherein a layer of liquid crystal polymer composite is arranged in said display elements.

28. The projection display apparatus according to claim 25, wherein a layer of liquid crystal polymer composite is arranged in said display elements.

29. The projection display apparatus according to claim 15, wherein the display device comprises a single display element having a mozaic color filter for each pixel.

* * * * *